(12) United States Patent
Ramaswamy et al.

(10) Patent No.: US 12,218,845 B2
(45) Date of Patent: Feb. 4, 2025

(54) NETWORK-AWARE LOAD BALANCING

(71) Applicant: VMware LLC, Palo Alto, CA (US)

(72) Inventors: Navaneeth Krishnan Ramaswamy, Chennai (IN); Gopa Kumar, Milpitas, CA (US)

(73) Assignee: VMware LLC, Palo Alto, CA (US)

( * ) Notice: Subject to any disclaimer, the term of this patent is extended or adjusted under 35 U.S.C. 154(b) by 497 days.

(21) Appl. No.: 17/517,639

(22) Filed: Nov. 2, 2021

(65) Prior Publication Data

US 2022/0231949 A1 Jul. 21, 2022

(30) Foreign Application Priority Data

Jan. 18, 2021 (IN) .............................. 202141002309

(51) Int. Cl.
*H04L 47/125* (2022.01)
*H04L 45/121* (2022.01)
(Continued)

(52) U.S. Cl.
CPC .......... *H04L 47/125* (2013.01); *H04L 45/121* (2013.01); *H04L 45/24* (2013.01); *H04L 47/122* (2013.01); *H04W 8/04* (2013.01)

(58) Field of Classification Search
CPC .................................................. H04L 47/125
See application file for complete search history.

(56) References Cited

U.S. PATENT DOCUMENTS 5,652,751 A 7/1997 Sharony
5,909,553 A 6/1999 Campbell et al.
(Continued)

FOREIGN PATENT DOCUMENTS

CN 1483270 A 3/2004
CN 1926809 A 3/2007
(Continued)

OTHER PUBLICATIONS

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.
(Continued)

*Primary Examiner* — Donald L Mills
(74) *Attorney, Agent, or Firm* — Quarles & Brady LLP

(57) ABSTRACT

Some embodiments of the invention provide a method for network-aware load balancing for data messages traversing a software-defined wide area network (SD-WAN) (e.g., a virtual network) including multiple connection links between different elements of the SD-WAN. The method includes receiving, at a load balancer in a multi-machine site, link state data relating to a set of SD-WAN datapaths including connection links of the multiple connection links. The load balancer, in some embodiments, provides load balancing for data messages sent from a machine in the multi-machine site to a set of destination machines (e.g., web servers, database servers, etc.) connected to the load balancer over the set of SD-WAN datapaths. The load balancer selects, for the data message, a particular destination machine (e.g., a frontend machine for a set of backend servers) in the set of destination machines by performing a load balancing operation based on the received link state data.

21 Claims, 11 Drawing Sheets

(51) Int. Cl.
*H04L 45/24* (2022.01)
*H04L 47/122* (2022.01)
*H04W 8/04* (2009.01)

(56) References Cited

U.S. PATENT DOCUMENTS

| | | | |
|---|---|---|---|
| 6,154,465 | A | 11/2000 | Pickett |
| 6,157,648 | A | 12/2000 | Voit et al. |
| 6,201,810 | B1 | 3/2001 | Masuda et al. |
| 6,363,378 | B1 | 3/2002 | Conklin et al. |
| 6,445,682 | B1 | 9/2002 | Weitz |
| 6,744,775 | B1 | 6/2004 | Beshai et al. |
| 6,976,087 | B1 | 12/2005 | Westfall et al. |
| 7,003,481 | B2 | 2/2006 | Banka et al. |
| 7,280,476 | B2 | 10/2007 | Anderson |
| 7,313,629 | B1 | 12/2007 | Nucci et al. |
| 7,320,017 | B1 | 1/2008 | Kurapati et al. |
| 7,373,660 | B1 | 5/2008 | Guichard et al. |
| 7,581,022 | B1 | 8/2009 | Griffin et al. |
| 7,680,925 | B2 | 3/2010 | Sathyanarayana et al. |
| 7,681,236 | B2 | 3/2010 | Tamura et al. |
| 7,751,409 | B1 | 7/2010 | Carolan |
| 7,962,458 | B2 | 6/2011 | Holenstein et al. |
| 8,051,185 | B2 | 11/2011 | Lee et al. |
| 8,094,575 | B1 | 1/2012 | Vadlakonda et al. |
| 8,094,659 | B1 | 1/2012 | Arad |
| 8,111,692 | B2 | 2/2012 | Ray |
| 8,141,156 | B1 | 3/2012 | Mao et al. |
| 8,224,971 | B1 | 7/2012 | Miller et al. |
| 8,228,928 | B2 | 7/2012 | Parandekar et al. |
| 8,243,589 | B1 | 8/2012 | Trost et al. |
| 8,259,566 | B2 | 9/2012 | Chen et al. |
| 8,274,891 | B2 | 9/2012 | Averi et al. |
| 8,301,749 | B1 | 10/2012 | Finklestein et al. |
| 8,385,227 | B1 | 2/2013 | Downey |
| 8,516,129 | B1 | 8/2013 | Skene |
| 8,566,452 | B1 | 10/2013 | Goodwin et al. |
| 8,588,066 | B2 | 11/2013 | Goel et al. |
| 8,630,291 | B2 | 1/2014 | Shaffer et al. |
| 8,661,295 | B1 | 2/2014 | Khanna et al. |
| 8,724,456 | B1 | 5/2014 | Hong et al. |
| 8,724,503 | B2 | 5/2014 | Johnsson et al. |
| 8,745,177 | B1 | 6/2014 | Kazerani et al. |
| 8,769,129 | B2 | 7/2014 | Watsen et al. |
| 8,797,874 | B2 | 8/2014 | Yu et al. |
| 8,799,504 | B2 | 8/2014 | Capone et al. |
| 8,804,745 | B1 | 8/2014 | Sinn |
| 8,806,482 | B1 | 8/2014 | Nagargadde et al. |
| 8,855,071 | B1 | 10/2014 | Sankaran et al. |
| 8,856,339 | B2 | 10/2014 | Mestery et al. |
| 8,964,548 | B1 | 2/2015 | Keralapura et al. |
| 8,989,199 | B1 | 3/2015 | Sella et al. |
| 9,009,217 | B1 | 4/2015 | Nagargadde et al. |
| 9,015,299 | B1 | 4/2015 | Shah |
| 9,019,837 | B2 | 4/2015 | Lue et al. |
| 9,055,000 | B1 | 6/2015 | Ghosh et al. |
| 9,060,025 | B2 | 6/2015 | Xu |
| 9,071,607 | B2 | 6/2015 | Twitchell, Jr. |
| 9,075,771 | B1 | 7/2015 | Gawali et al. |
| 9,100,329 | B1 | 8/2015 | Jiang et al. |
| 9,135,037 | B1 | 9/2015 | Petrescu-Prahova et al. |
| 9,137,334 | B2 | 9/2015 | Zhou |
| 9,154,327 | B1 | 10/2015 | Marino et al. |
| 9,203,764 | B2 | 12/2015 | Shirazipour et al. |
| 9,225,591 | B2 | 12/2015 | Beheshti-Zavareh et al. |
| 9,306,949 | B1 | 4/2016 | Richard et al. |
| 9,323,561 | B2 | 4/2016 | Ayala et al. |
| 9,336,040 | B2 | 5/2016 | Dong et al. |
| 9,354,983 | B1 | 5/2016 | Yenamandra et al. |
| 9,356,943 | B1 | 5/2016 | Lopilato et al. |
| 9,379,981 | B1 | 6/2016 | Zhou et al. |
| 9,413,724 | B2 | 8/2016 | Xu |
| 9,419,878 | B2 | 8/2016 | Hsiao et al. |
| 9,432,245 | B1 | 8/2016 | Sorenson et al. |
| 9,438,566 | B2 | 9/2016 | Zhang et al. |
| 9,450,817 | B1 | 9/2016 | Bahadur et al. |
| 9,450,852 | B1 | 9/2016 | Chen et al. |
| 9,462,010 | B1 | 10/2016 | Stevenson |
| 9,467,478 | B1 | 10/2016 | Khan et al. |
| 9,485,163 | B1 | 11/2016 | Fries et al. |
| 9,521,067 | B2 | 12/2016 | Michael et al. |
| 9,525,564 | B2 | 12/2016 | Lee |
| 9,542,219 | B1 | 1/2017 | Bryant et al. |
| 9,559,951 | B1 | 1/2017 | Sajassi et al. |
| 9,563,423 | B1 | 2/2017 | Pittman |
| 9,602,389 | B1 | 3/2017 | Maveli et al. |
| 9,608,917 | B1 | 3/2017 | Anderson et al. |
| 9,608,962 | B1 | 3/2017 | Chang |
| 9,614,748 | B1 | 4/2017 | Battersby et al. |
| 9,621,460 | B2 | 4/2017 | Mehta et al. |
| 9,641,551 | B1 | 5/2017 | Kariyanahalli |
| 9,648,547 | B1 | 5/2017 | Hart et al. |
| 9,665,432 | B2 | 5/2017 | Kruse et al. |
| 9,686,127 | B2 | 6/2017 | Ramachandran et al. |
| 9,692,714 | B1 | 6/2017 | Nair et al. |
| 9,715,401 | B2 | 7/2017 | Devine et al. |
| 9,717,021 | B2 | 7/2017 | Hughes et al. |
| 9,722,815 | B2 | 8/2017 | Mukundan et al. |
| 9,747,249 | B2 | 8/2017 | Cherian et al. |
| 9,755,965 | B1 | 9/2017 | Yadav et al. |
| 9,787,559 | B1 | 10/2017 | Schroeder |
| 9,807,004 | B2 | 10/2017 | Koley et al. |
| 9,819,540 | B1 | 11/2017 | Bahadur et al. |
| 9,819,565 | B2 | 11/2017 | Djukic et al. |
| 9,825,822 | B1 | 11/2017 | Holland |
| 9,825,911 | B1 | 11/2017 | Brandwine |
| 9,825,992 | B2 | 11/2017 | Xu |
| 9,832,128 | B1 | 11/2017 | Ashner et al. |
| 9,832,205 | B2 | 11/2017 | Santhi et al. |
| 9,875,355 | B1 | 1/2018 | Williams |
| 9,906,401 | B1 | 2/2018 | Rao |
| 9,923,826 | B2 | 3/2018 | Murgia |
| 9,930,011 | B1 | 3/2018 | Clemons, Jr. et al. |
| 9,935,829 | B1 | 4/2018 | Miller et al. |
| 9,942,787 | B1 | 4/2018 | Tillotson |
| 9,996,370 | B1 | 6/2018 | Khafizov et al. |
| 10,038,601 | B1 | 7/2018 | Becker et al. |
| 10,057,183 | B2 | 8/2018 | Salle et al. |
| 10,057,294 | B2 | 8/2018 | Xu |
| 10,116,593 | B1 | 10/2018 | Sinn et al. |
| 10,135,789 | B2 | 11/2018 | Mayya et al. |
| 10,142,226 | B1 | 11/2018 | Wu et al. |
| 10,178,032 | B1 | 1/2019 | Freitas |
| 10,178,037 | B2 | 1/2019 | Appleby et al. |
| 10,187,289 | B1 | 1/2019 | Chen et al. |
| 10,200,264 | B2 | 2/2019 | Menon et al. |
| 10,229,017 | B1 | 3/2019 | Zou et al. |
| 10,237,123 | B2 | 3/2019 | Dubey et al. |
| 10,250,498 | B1 | 4/2019 | Bales et al. |
| 10,263,832 | B1 | 4/2019 | Ghosh |
| 10,263,848 | B2 | 4/2019 | Wolting |
| 10,320,664 | B2 | 6/2019 | Nainar et al. |
| 10,320,691 | B1 | 6/2019 | Matthews et al. |
| 10,326,830 | B1 | 6/2019 | Singh |
| 10,348,767 | B1 | 7/2019 | Lee et al. |
| 10,355,989 | B1 | 7/2019 | Panchal et al. |
| 10,425,382 | B2 | 9/2019 | Mayya et al. |
| 10,454,708 | B2 | 10/2019 | Mibu |
| 10,454,714 | B2 | 10/2019 | Mayya et al. |
| 10,461,993 | B2 | 10/2019 | Turabi et al. |
| 10,498,652 | B2 | 12/2019 | Mayya et al. |
| 10,511,546 | B2 | 12/2019 | Singarayan et al. |
| 10,523,539 | B2 | 12/2019 | Mayya et al. |
| 10,550,093 | B2 | 2/2020 | Ojima et al. |
| 10,554,538 | B2 | 2/2020 | Spohn et al. |
| 10,560,431 | B1 | 2/2020 | Chen et al. |
| 10,565,464 | B2 | 2/2020 | Han et al. |
| 10,567,519 | B1 | 2/2020 | Mukhopadhyaya et al. |
| 10,574,482 | B2 | 2/2020 | Oré et al. |
| 10,574,528 | B2 | 2/2020 | Mayya et al. |
| 10,594,516 | B2 | 3/2020 | Cidon et al. |
| 10,594,591 | B2 | 3/2020 | Houjyo et al. |
| 10,594,659 | B2 | 3/2020 | El-Moussa et al. |
| 10,608,844 | B2 | 3/2020 | Cidon et al. |

(56) References Cited

U.S. PATENT DOCUMENTS

| | | |
|---|---|---|
| 10,630,505 B2 | 4/2020 | Rubenstein et al. |
| 10,637,889 B2 | 4/2020 | Ermagan et al. |
| 10,666,460 B2 | 5/2020 | Cidon et al. |
| 10,666,497 B2 | 5/2020 | Tahhan et al. |
| 10,686,625 B2 | 6/2020 | Cidon et al. |
| 10,693,739 B1 | 6/2020 | Naseri et al. |
| 10,708,144 B2 | 7/2020 | Mohan et al. |
| 10,715,382 B2 | 7/2020 | Guan et al. |
| 10,715,427 B2 | 7/2020 | Raj et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,778,557 B2 | 9/2020 | Ganichev et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,924,388 B1 | 2/2021 | Burns et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 10,999,197 B2 | 5/2021 | Hooda et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,595 B2 | 8/2021 | Knutsen et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,146,632 B2 | 10/2021 | Rubenstein |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 11,310,170 B2 | 4/2022 | Cidon et al. |
| 11,323,307 B2 | 5/2022 | Mayya et al. |
| 11,349,722 B2 | 5/2022 | Mayya et al. |
| 11,363,124 B2 | 6/2022 | Markuze et al. |
| 11,374,904 B2 | 6/2022 | Mayya et al. |
| 11,375,005 B1 | 6/2022 | Rolando et al. |
| 11,381,474 B1 | 7/2022 | Kumar et al. |
| 11,381,499 B1 | 7/2022 | Ramaswamy et al. |
| 11,388,086 B1 | 7/2022 | Ramaswamy et al. |
| 11,394,640 B2 | 7/2022 | Ramaswamy et al. |
| 11,418,997 B2 | 8/2022 | Devadoss et al. |
| 11,438,789 B2 | 9/2022 | Devadoss et al. |
| 11,444,865 B2 | 9/2022 | Ramaswamy et al. |
| 11,444,872 B2 | 9/2022 | Mayya et al. |
| 11,477,127 B2 | 10/2022 | Ramaswamy et al. |
| 11,489,720 B1 | 11/2022 | Kempanna et al. |
| 11,489,783 B2 | 11/2022 | Ramaswamy et al. |
| 11,509,571 B1 | 11/2022 | Ramaswamy et al. |
| 11,516,049 B2 | 11/2022 | Cidon et al. |
| 11,522,780 B1 | 12/2022 | Wallace et al. |
| 11,526,434 B1 | 12/2022 | Brooker et al. |
| 11,533,248 B2 | 12/2022 | Mayya et al. |
| 11,552,874 B1 | 1/2023 | Pragada et al. |
| 11,575,591 B2 | 2/2023 | Ramaswamy et al. |
| 11,575,600 B2 | 2/2023 | Markuze et al. |
| 11,582,144 B2 | 2/2023 | Ramaswamy et al. |
| 11,582,298 B2 | 2/2023 | Hood et al. |
| 11,601,356 B2 | 3/2023 | Gandhi et al. |
| 11,606,225 B2 | 3/2023 | Cidon et al. |
| 11,606,286 B2 | 3/2023 | Michael et al. |
| 11,606,314 B2 | 3/2023 | Cidon et al. |
| 11,606,712 B2 | 3/2023 | Devadoss et al. |
| 11,611,507 B2 | 3/2023 | Ramaswamy et al. |
| 11,637,768 B2 | 4/2023 | Ramaswamy et al. |
| 11,677,720 B2 | 6/2023 | Mayya et al. |
| 11,689,959 B2 | 6/2023 | Devadoss et al. |
| 11,700,196 B2 | 7/2023 | Michael et al. |
| 11,706,126 B2 | 7/2023 | Silva et al. |
| 11,706,127 B2 | 7/2023 | Michael et al. |
| 11,709,710 B2 | 7/2023 | Markuze et al. |
| 11,716,286 B2 | 8/2023 | Ramaswamy et al. |
| 11,722,925 B2 | 8/2023 | Devadoss et al. |
| 11,729,065 B2 | 8/2023 | Ramaswamy et al. |
| 2002/0049687 A1 | 4/2002 | Helsper et al. |
| 2002/0075542 A1 | 6/2002 | Kumar et al. |
| 2002/0085488 A1 | 7/2002 | Kobayashi |
| 2002/0087716 A1 | 7/2002 | Mustafa |
| 2002/0152306 A1 | 10/2002 | Tuck |
| 2002/0186682 A1 | 12/2002 | Kawano et al. |
| 2002/0198840 A1 | 12/2002 | Banka et al. |
| 2003/0050061 A1 | 3/2003 | Wu et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0161321 A1 | 8/2003 | Karam et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0149604 A1 | 7/2005 | Navada |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0210479 A1 | 9/2005 | Andjelic |
| 2005/0265255 A1 | 12/2005 | Kodialam et al. |
| 2006/0002291 A1 | 1/2006 | Alicherry et al. |
| 2006/0034335 A1 | 2/2006 | Karaoguz et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2006/0195605 A1 | 8/2006 | Sundarrajan et al. |
| 2006/0245414 A1 | 11/2006 | Susai et al. |
| 2007/0050594 A1 | 3/2007 | Augsburg et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162619 A1 | 7/2007 | Aloni et al. |
| 2007/0162639 A1 | 7/2007 | Chu et al. |
| 2007/0177511 A1 | 8/2007 | Das et al. |
| 2007/0195797 A1 | 8/2007 | Patel et al. |
| 2007/0237081 A1 | 10/2007 | Kodialam et al. |

(56) References Cited

U.S. PATENT DOCUMENTS

| | | |
|---|---|---|
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0168086 A1 | 7/2008 | Miller et al. |
| 2008/0175150 A1 | 7/2008 | Bolt et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2008/0263218 A1 | 10/2008 | Beerends et al. |
| 2009/0013210 A1 | 1/2009 | McIntosh et al. |
| 2009/0028092 A1 | 1/2009 | Rothschild |
| 2009/0125617 A1 | 5/2009 | Klessig et al. |
| 2009/0141642 A1 | 6/2009 | Sun |
| 2009/0154463 A1 | 6/2009 | Hines et al. |
| 2009/0182874 A1 | 7/2009 | Morford et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1 | 4/2010 | Hiscock |
| 2010/0091823 A1 | 4/2010 | Retana et al. |
| 2010/0098092 A1 | 4/2010 | Luo et al. |
| 2010/0100768 A1 | 4/2010 | Yamamoto et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0128600 A1 | 5/2010 | Srinivasmurthy et al. |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0001604 A1 | 1/2011 | Ludlow et al. |
| 2011/0007752 A1 | 1/2011 | Silva et al. |
| 2011/0032939 A1 | 2/2011 | Nozaki et al. |
| 2011/0035187 A1 | 2/2011 | DeJori et al. |
| 2011/0040814 A1 | 2/2011 | Higgins |
| 2011/0075674 A1 | 3/2011 | Li et al. |
| 2011/0078783 A1 | 3/2011 | Duan et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2011/0302663 A1 | 12/2011 | Prodan et al. |
| 2012/0008630 A1 | 1/2012 | Ould-Brahim |
| 2012/0027013 A1 | 2/2012 | Napierala |
| 2012/0039309 A1 | 2/2012 | Evans et al. |
| 2012/0099601 A1 | 4/2012 | Haddad et al. |
| 2012/0136697 A1 | 5/2012 | Peles et al. |
| 2012/0140935 A1 | 6/2012 | Kruglick |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shatzkamer et al. |
| 2012/0240185 A1 | 9/2012 | Kapoor et al. |
| 2012/0250682 A1 | 10/2012 | Vincent et al. |
| 2012/0250686 A1 | 10/2012 | Vincent et al. |
| 2012/0266026 A1 | 10/2012 | Chikkalingaiah et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0007505 A1 | 1/2013 | Spear |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103729 A1 | 4/2013 | Cooney et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128757 A1 | 5/2013 | Chowdhary et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173768 A1 | 7/2013 | Kundu et al. |
| 2013/0173788 A1 | 7/2013 | Song |
| 2013/0182712 A1 | 7/2013 | Aguayo et al. |
| 2013/0185446 A1 | 7/2013 | Zeng et al. |
| 2013/0185729 A1 | 7/2013 | Vasic et al. |
| 2013/0191688 A1 | 7/2013 | Agarwal et al. |
| 2013/0223226 A1 | 8/2013 | Narayanan et al. |
| 2013/0223454 A1 | 8/2013 | Dunbar et al. |
| 2013/0235870 A1 | 9/2013 | Tripathi et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0258939 A1 | 10/2013 | Wang |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0122559 A1 | 5/2014 | Branson et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0157363 A1 | 6/2014 | Banerjee |
| 2014/0160935 A1 | 6/2014 | Zecharia et al. |
| 2014/0164560 A1 | 6/2014 | Ko et al. |
| 2014/0164617 A1 | 6/2014 | Jalan et al. |

(56) References Cited

U.S. PATENT DOCUMENTS

| | | |
|---|---|---|
| 2014/0164718 A1 | 6/2014 | Schaik et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0189074 A1 | 7/2014 | Parker |
| 2014/0208317 A1 | 7/2014 | Nakagawa |
| 2014/0219135 A1 | 8/2014 | Li et al. |
| 2014/0223507 A1 | 8/2014 | Xu |
| 2014/0226664 A1 | 8/2014 | Chen et al. |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0310282 A1 | 10/2014 | Sprague et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0337674 A1 | 11/2014 | Ivancic et al. |
| 2014/0341109 A1 | 11/2014 | Cartmell et al. |
| 2014/0351394 A1 | 11/2014 | Elisha |
| 2014/0355441 A1 | 12/2014 | Jain |
| 2014/0365834 A1 | 12/2014 | Stone et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0100958 A1 | 4/2015 | Banavalikar et al. |
| 2015/0106809 A1 | 4/2015 | Reddy et al. |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0264055 A1 | 9/2015 | Budhani et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0326426 A1 | 11/2015 | Luo et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358232 A1 | 12/2015 | Chen et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381462 A1 | 12/2015 | Choi et al. |
| 2015/0381493 A1 | 12/2015 | Bansal et al. |
| 2016/0019317 A1 | 1/2016 | Pawar et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080268 A1 | 3/2016 | Anand et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134527 A1 | 5/2016 | Kwak et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0147607 A1 | 5/2016 | Dornemann et al. |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0205071 A1 | 7/2016 | Cooper et al. |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0234099 A1 | 8/2016 | Jiao |
| 2016/0234161 A1 | 8/2016 | Banerjee et al. |
| 2016/0255169 A1 | 9/2016 | Kovvuri et al. |
| 2016/0255542 A1 | 9/2016 | Hughes et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0299775 A1 | 10/2016 | Madapurath et al. |
| 2016/0301471 A1 | 10/2016 | Kunz et al. |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0337202 A1 | 11/2016 | Ben-Itzhak et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0024260 A1 | 1/2017 | Chandrasekaran et al. |
| 2017/0026273 A1 | 1/2017 | Yao et al. |
| 2017/0026283 A1 | 1/2017 | Williams et al. |

(56) References Cited

U.S. PATENT DOCUMENTS

| | | |
|---|---|---|
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063783 A1 | 3/2017 | Yong et al. |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118067 A1 | 4/2017 | Vedula |
| 2017/0118173 A1 | 4/2017 | Arramreddy et al. |
| 2017/0123939 A1 | 5/2017 | Maheshwari et al. |
| 2017/0126475 A1 | 5/2017 | Mahkonen et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0155566 A1 | 6/2017 | Martinsen et al. |
| 2017/0155590 A1 | 6/2017 | Dillon et al. |
| 2017/0163473 A1 | 6/2017 | Sadana et al. |
| 2017/0171024 A1 | 6/2017 | Anerousis et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201568 A1 | 7/2017 | Hussam et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0236060 A1 | 8/2017 | Ignatyev |
| 2017/0237710 A1 | 8/2017 | Mayya et al. |
| 2017/0242784 A1 | 8/2017 | Heorhiadi et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302501 A1 | 10/2017 | Shi et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317945 A1 | 11/2017 | Guo et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0324628 A1 | 11/2017 | Dhanabalan |
| 2017/0337086 A1 | 11/2017 | Zhu et al. |
| 2017/0339022 A1 | 11/2017 | Hegde et al. |
| 2017/0339054 A1 | 11/2017 | Yadav et al. |
| 2017/0339070 A1 | 11/2017 | Chang et al. |
| 2017/0346722 A1 | 11/2017 | Smith et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0041470 A1 | 2/2018 | Schultz et al. |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0091370 A1 | 3/2018 | Arai |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0123946 A1 | 5/2018 | Ramachandran et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0176252 A1 | 6/2018 | Nimmagadda et al. |
| 2018/0181423 A1 | 6/2018 | Gunda et al. |
| 2018/0205746 A1 | 7/2018 | Boutnaru et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0261085 A1 | 9/2018 | Liu et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0359323 A1 | 12/2018 | Madden |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0021085 A1 | 1/2019 | Mochizuki et al. |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |

(56) References Cited

U.S. PATENT DOCUMENTS

| | | |
|---|---|---|
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0081894 A1 | 3/2019 | Yousaf et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0132234 A1 | 5/2019 | Dong et al. |
| 2019/0132322 A1 | 5/2019 | Song et al. |
| 2019/0140889 A1 | 5/2019 | Mayya et al. |
| 2019/0140890 A1 | 5/2019 | Mayya et al. |
| 2019/0149525 A1 | 5/2019 | Gunda et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0222499 A1 | 7/2019 | Chen et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0238497 A1 | 8/2019 | Tourrilhes et al. |
| 2019/0268421 A1 | 8/2019 | Markuze et al. |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0288875 A1 | 9/2019 | Shen et al. |
| 2019/0306197 A1 | 10/2019 | Degioanni |
| 2019/0306282 A1 | 10/2019 | Masputra et al. |
| 2019/0313278 A1 | 10/2019 | Liu |
| 2019/0313907 A1 | 10/2019 | Khachaturian et al. |
| 2019/0319847 A1 | 10/2019 | Nahar et al. |
| 2019/0319881 A1 | 10/2019 | Maskara et al. |
| 2019/0327109 A1 | 10/2019 | Guichard et al. |
| 2019/0334786 A1 | 10/2019 | Dutta et al. |
| 2019/0334813 A1 | 10/2019 | Raj et al. |
| 2019/0334820 A1 | 10/2019 | Zhao |
| 2019/0342201 A1 | 11/2019 | Singh |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0067831 A1 | 2/2020 | Spraggins et al. |
| 2020/0092207 A1 | 3/2020 | Sipra et al. |
| 2020/0097327 A1 | 3/2020 | Beyer et al. |
| 2020/0099625 A1 | 3/2020 | Yigit et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0159661 A1 | 5/2020 | Keymolen et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0241927 A1 | 7/2020 | Yang et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0267203 A1 | 8/2020 | Jindal et al. |
| 2020/0280587 A1 | 9/2020 | Janakiraman et al. |
| 2020/0287819 A1 | 9/2020 | Theogaraj et al. |
| 2020/0287976 A1* | 9/2020 | Theogaraj ............... H04L 67/51 |
| 2020/0296011 A1 | 9/2020 | Jain et al. |
| 2020/0296026 A1 | 9/2020 | Michael et al. |
| 2020/0301764 A1 | 9/2020 | Thoresen et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344089 A1 | 10/2020 | Motwani et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0403821 A1 | 12/2020 | Dev et al. |
| 2020/0412483 A1 | 12/2020 | Tan et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0021538 A1 | 1/2021 | Meck et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0037159 A1 | 2/2021 | Shimokawa |
| 2021/0049191 A1 | 2/2021 | Masson et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |

(56) References Cited

U.S. PATENT DOCUMENTS

| | | |
|---|---|---|
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0073001 A1 | 3/2021 | Rogers et al. |
| 2021/0092062 A1 | 3/2021 | Dhanabalan et al. |
| 2021/0099360 A1 | 4/2021 | Parsons et al. |
| 2021/0105199 A1 | 4/2021 | H et al. |
| 2021/0111998 A1 | 4/2021 | Saavedra |
| 2021/0112034 A1 | 4/2021 | Sundararajan et al. |
| 2021/0126830 A1 | 4/2021 | R. et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0176255 A1 | 6/2021 | Hill et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0314385 A1 | 10/2021 | Pande et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0392171 A1 | 12/2021 | Srinivas et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0400512 A1 | 12/2021 | Agarwal et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0029902 A1 | 1/2022 | Shemer et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0045927 A1 | 2/2022 | Liu et al. |
| 2022/0052928 A1 | 2/2022 | Sundararajan et al. |
| 2022/0061059 A1 | 2/2022 | Dunsmore et al. |
| 2022/0086035 A1 | 3/2022 | Devaraj et al. |
| 2022/0094644 A1 | 3/2022 | Cidon et al. |
| 2022/0123961 A1* | 4/2022 | Mukundan .......... H04L 47/2408 |
| 2022/0131740 A1 | 4/2022 | Mayya et al. |
| 2022/0131807 A1 | 4/2022 | Srinivas et al. |
| 2022/0131898 A1 | 4/2022 | Hooda et al. |
| 2022/0141184 A1 | 5/2022 | Oswal et al. |
| 2022/0158923 A1 | 5/2022 | Ramaswamy et al. |
| 2022/0158924 A1 | 5/2022 | Ramaswamy et al. |
| 2022/0158926 A1 | 5/2022 | Wennerström et al. |
| 2022/0166663 A1* | 5/2022 | Banka .................. H04W 24/08 |
| 2022/0166713 A1 | 5/2022 | Markuze et al. |
| 2022/0191719 A1 | 6/2022 | Roy |
| 2022/0198229 A1 | 6/2022 | López et al. |
| 2022/0210035 A1 | 6/2022 | Hendrickson et al. |
| 2022/0210041 A1 | 6/2022 | Gandhi et al. |
| 2022/0210042 A1 | 6/2022 | Gandhi et al. |
| 2022/0210122 A1 | 6/2022 | Levin et al. |
| 2022/0217015 A1 | 7/2022 | Vuggrala et al. |
| 2022/0231950 A1 | 7/2022 | Ramaswamy et al. |
| 2022/0232411 A1 | 7/2022 | Vijayakumar et al. |
| 2022/0239596 A1 | 7/2022 | Kumar et al. |
| 2022/0294701 A1 | 9/2022 | Mayya et al. |
| 2022/0335027 A1 | 10/2022 | Seshadri et al. |
| 2022/0337553 A1 | 10/2022 | Mayya et al. |
| 2022/0353152 A1 | 11/2022 | Ramaswamy |
| 2022/0353171 A1 | 11/2022 | Ramaswamy et al. |
| 2022/0353175 A1 | 11/2022 | Ramaswamy et al. |
| 2022/0353182 A1 | 11/2022 | Ramaswamy et al. |
| 2022/0353190 A1 | 11/2022 | Ramaswamy et al. |
| 2022/0360500 A1 | 11/2022 | Ramaswamy et al. |
| 2022/0407773 A1 | 12/2022 | Kempanna et al. |
| 2022/0407774 A1 | 12/2022 | Kempanna et al. |
| 2022/0407790 A1 | 12/2022 | Kempanna et al. |
| 2022/0407820 A1 | 12/2022 | Kempanna et al. |
| 2022/0407915 A1 | 12/2022 | Kempanna et al. |
| 2023/0006929 A1 | 1/2023 | Mayya et al. |
| 2023/0025586 A1 | 1/2023 | Rolando et al. |
| 2023/0026330 A1 | 1/2023 | Rolando et al. |
| 2023/0026865 A1 | 1/2023 | Rolando et al. |
| 2023/0028872 A1 | 1/2023 | Ramaswamy |
| 2023/0039869 A1 | 2/2023 | Ramaswamy et al. |
| 2023/0041916 A1 | 2/2023 | Zhang et al. |
| 2023/0054961 A1 | 2/2023 | Ramaswamy et al. |
| 2023/0103683 A1* | 4/2023 | Sundararajan .......... H04L 45/64 370/351 |
| 2023/0105680 A1 | 4/2023 | Simlai et al. |
| 2023/0121871 A1 | 4/2023 | Mayya et al. |
| 2023/0164158 A1 | 5/2023 | Fellows et al. |
| 2023/0179445 A1 | 6/2023 | Cidon et al. |
| 2023/0179502 A1 | 6/2023 | Ramaswamy et al. |
| 2023/0179521 A1 | 6/2023 | Markuze et al. |
| 2023/0179543 A1 | 6/2023 | Cidon et al. |
| 2023/0216768 A1 | 7/2023 | Zohar et al. |
| 2023/0216801 A1 | 7/2023 | Markuze et al. |
| 2023/0216804 A1 | 7/2023 | Zohar et al. |
| 2023/0221874 A1 | 7/2023 | Markuze et al. |
| 2023/0224356 A1 | 7/2023 | Markuze et al. |
| 2023/0224759 A1 | 7/2023 | Ramaswamy |
| 2023/0231845 A1 | 7/2023 | Manoharan et al. |
| 2023/0239234 A1 | 7/2023 | Zohar et al. |
| 2023/0261974 A1 | 8/2023 | Ramaswamy et al. |
| 2023/0308421 A1 | 9/2023 | Mayya et al. |

FOREIGN PATENT DOCUMENTS

| | | |
|---|---|---|
| CN | 102577270 A | 7/2012 |
| CN | 102811165 A | 12/2012 |
| CN | 104205757 A | 12/2014 |
| CN | 104956329 A | 9/2015 |
| CN | 106230650 A | 12/2016 |
| CN | 106656847 A | 5/2017 |
| CN | 106998284 A | 8/2017 |
| CN | 110447209 A | 11/2019 |
| CN | 111198764 A | 5/2020 |
| EP | 1031224 B1 | 3/2005 |
| EP | 1912381 A1 | 4/2008 |
| EP | 2538637 A2 | 12/2012 |
| EP | 2763362 A1 | 8/2014 |
| EP | 3041178 A1 | 7/2016 |
| EP | 3297211 A1 | 3/2018 |
| EP | 3509256 A1 | 7/2019 |
| EP | 3346650 B1 | 11/2019 |
| EP | 4189937 A1 | 6/2023 |
| JP | 2002368792 A | 12/2002 |
| JP | 2010233126 A | 10/2010 |
| JP | 2014200010 A | 10/2014 |
| JP | 2017059991 A | 3/2017 |
| JP | 2017524290 A | 8/2017 |
| KR | 20170058201 A | 5/2017 |
| RU | 2574350 C2 | 2/2016 |
| WO | 2000078004 A2 | 12/2000 |
| WO | 03073701 A1 | 9/2003 |
| WO | 2005071861 A1 | 8/2005 |
| WO | 2007016834 A1 | 2/2007 |
| WO | 2012167184 A2 | 12/2012 |
| WO | 2015092565 A1 | 6/2015 |
| WO | 2016061546 A1 | 4/2016 |
| WO | 2016123314 A1 | 8/2016 |

(56) References Cited

FOREIGN PATENT DOCUMENTS

| | | | |
|---|---|---|---|
| WO | 2017083975 | A1 | 5/2017 |
| WO | 2019070611 | A1 | 4/2019 |
| WO | 2019094522 | A1 | 5/2019 |
| WO | 2020012491 | A1 | 1/2020 |
| WO | 2020018704 | A1 | 1/2020 |
| WO | 2020091777 | A1 | 5/2020 |
| WO | 2020101922 | A1 | 5/2020 |
| WO | 2020112345 | A1 | 6/2020 |
| WO | 2021040934 | A1 | 3/2021 |
| WO | 2021118717 | A1 | 6/2021 |
| WO | 2021150465 | A1 | 7/2021 |
| WO | 2021211906 | A1 | 10/2021 |
| WO | 2022005607 | A1 | 1/2022 |
| WO | 2022082680 | A1 | 4/2022 |
| WO | 2022154850 | A1 | 7/2022 |
| WO | 2022159156 | A1 | 7/2022 |
| WO | 2022231668 | A1 | 11/2022 |
| WO | 2022235303 | A1 | 11/2022 |
| WO | 2022265681 | A1 | 12/2022 |
| WO | 2023009159 | A1 | 2/2023 |

OTHER PUBLICATIONS

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.IEEE.org/document/7060482.

Cox, Jacob H., et al., "Advancing Software-Defined Networks: a Survey," IEEE Access, Oct. 12, 2017, 40 pages, vol. 5, IEEE, retrieved from https://ieeexplore.IEEE.org/document/8066287.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Li, Shengru, et al., "Source Routing with Protocol oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

PCT International Search Report and Written Opinion of commonly owned International Patent Application PCT/US2021/057794, mailed Feb. 22, 2022, 14 pages, International Searching Authority (EPO).

Tootaghaj, Diman Zad, et al., "Homa: an Efficient Topology and Route Management Approach in SD-WAN Overlays," IEEE Infocom 2020—IEEE Conference on Computer Communications, Jul. 6-9, 2020, 10 pages, IEEE, Toronto, ON, Canada.

Alsaeedi, Mohammed, et al., "Toward Adaptive and Scalable OpenFlow-SDN Flow Control: a Survey," IEEE Access, Aug. 1, 2019, 34 pages, vol. 7, IEEE, retrieved from https://ieeexplore.IEEE.org/document/8784036.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Fortz, Bernard, et al., "Internet Traffic Engineering by Optimizing OSPF Weights," Proceedings IEEE Infocom 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Guo, Xiangyi, et al., (U.S. Appl. No. 62/925,193) filed Oct. 23, 2019, 26 pages.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Lasserre, Marc, et al., "Framework for Data Center (DC) Network Virtualization," RFC 7365, Oct. 2014, 26 pages, IETF.

Lin, Weidong, et al., "Using Path Label Routing in Wide Area Software-Defined Networks with Open Flow," 2016 International Conference on Networking and Network Applications, Jul. 2016, 6 pages, IEEE.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: a Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned Related International Patent Application PCT/US2021/057794 with similar specification, filed Nov. 2, 2021, 49 pages, VMware, Inc.

Non-Published Commonly Owned U.S. Appl. No. 17/103,614, filed Nov. 24, 2020, 38 pages, VMware, Inc.

Non-Published Commonly Owned U.S. Appl. No. 17/143,092, filed Jan. 6, 2021, 42 pages, VMware, Inc.

Non-Published Commonly Owned U.S. Appl. No. 17/143,094, filed Jan. 6, 2021, 42 pages, VMware, Inc.

Non-Published Commonly Owned U.S. Appl. No. 17/194,038, filed Mar. 5, 2021, 35 pages, VMware, Inc.

Non-Published Commonly Owned U.S. Appl. No. 17/227,016, filed Apr. 9, 2021, 37 pages, VMware, Inc.

Non-Published Commonly Owned U.S. Appl. No. 17/227,044, filed Apr. 9, 2021, 37 pages, VMware, Inc.

Non-Published Commonly Owned U.S. Appl. No. 17/351,327, filed Jun. 18, 2021, 48 pages, VMware, Inc.

Non-Published Commonly Owned U.S. Appl. No. 17/351,333, filed Jun. 18, 2021, 47 pages, VMware, Inc.

Non-Published Commonly Owned U.S. Appl. No. 17/351,340, filed Jun. 18, 2021, 48 pages, VMware, Inc.

Non-Published Commonly Owned U.S. Appl. No. 17/351,342, filed Jun. 18, 2021, 47 pages, VMware, Inc.

Non-Published Commonly Owned U.S. Appl. No. 17/351,345, filed Jun. 18, 2021, 48 pages, VMware, Inc.

Non-Published Commonly Owned U.S. Appl. No. 17/384,735, filed Jul. 24, 2021, 62 pages, VMware, Inc.

Non-Published Commonly Owned U.S. Appl. No. 17/384,736, filed Jul. 24, 2021, 63 pages, VMware, Inc.

Non-Published Commonly Owned U.S. Appl. No. 17/384,737, filed Jul. 24, 2021, 63 pages, VMware, Inc.

Non-Published Commonly Owned U.S. Appl. No. 17/384,738, filed Jul. 24, 2021, 62 pages, VMware, Inc.

Non-Published Commonly Owned U.S. Appl. No. 17/510,862, filed Oct. 26, 2021, 46 pages, VMware, Inc.

Non-Published Commonly Owned Related U.S. Appl. No. 17/517,641 with similar specification, filed Nov. 2, 2021, 46 pages, VMware, Inc.

(56) References Cited

OTHER PUBLICATIONS

Non-Published Commonly Owned U.S. Appl. No. 17/542,413, filed Dec. 4, 2021, 173 pages, VMware, Inc.
Non-Published Commonly Owned U.S. Appl. No. 17/562,890, filed Dec. 27, 2021, 36 pages, Nicira, Inc.
Non-Published Commonly Owned U.S. Appl. No. 17/572,583, filed Jan. 10, 2022, 33 pages, Nicira, Inc.
Non-Published Commonly Owned U.S. Appl. No. 15/803,964, filed Nov. 6, 2017, 15 pages, the Mode Group.
Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.
Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.
Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.
Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.
Author Unknown, "VeloCloud Administration Guide: VMware SD-WAN by VeloCloud 3.3," Month Unknown 2019, 366 pages, VMware, Inc., Palo Alto, CA, USA.
Non-Published Commonly Owned U.S. Appl. No. 18/137,584, filed Apr. 21, 2023, 57 pages, VMware, Inc.
Non-Published Commonly Owned U.S. Appl. No. 17/943,147, filed Sep. 12, 2022, 42 pages, Nicira, Inc.
Non-Published Commonly Owned U.S. Appl. No. 17/967,795, filed Oct. 17, 2022, 39 pages, VMware, Inc.
Non-Published Commonly Owned U.S. Appl. No. 17/976,784, filed Oct. 29, 2022, 55 pages, VMware, Inc.
Non-Published Commonly Owned U.S. Appl. No. 18/083,536, filed Dec. 18, 2022, 27 pages, VMware, Inc.
Taleb, Tarik, "D4.1 Mobile Network Cloud Component Design," Mobile Cloud Networking, Nov. 8, 2013, 210 pages, MobileCloud Networking Consortium, retrieved from http://www.mobile-cloud-networking.eu/site/index.php?process=download&id=127&code=89d30565cd2ce087d3f8e95f9ad683066510a61f.
Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.
Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.
Non-Published Commonly Owned U.S. Appl. No. 18/222,864, filed Jul. 17, 2023, 350 pages, VMware, Inc.
Non-Published Commonly Owned U.S. Appl. No. 18/222,868, filed Jul. 17, 2023, 22 pages, VMware, Inc.
Non-Published Commonly Owned U.S. Appl. No. 18/224,466, filed Jul. 20, 2023, 56 pages, VMware, Inc.
Non-Published Commonly Owned U.S. Appl. No. 18/235,879, filed Aug. 20, 2023, 173 pages, VMware, Inc.
Non-Published Commonly Owned U.S. Appl. No. 18/102,685, filed Jan. 28, 2023, 124 pages, VMware, Inc.
Non-Published Commonly Owned U.S. Appl. No. 18/102,687, filed Jan. 28, 2023, 172 pages, VMware, Inc.
Non-Published Commonly Owned U.S. Appl. No. 18/102,688, filed Jan. 28, 2023, 49 pages, VMware, Inc.
Non-Published Commonly Owned U.S. Appl. No. 18/102,689, filed Jan. 28, 2023, 46 pages, VMware, Inc.
Non-Published Commonly Owned U.S. Appl. No. 17/827,972, filed May 30, 2022, 30 pages, Nicira, Inc.
Non-Published Commonly Owned U.S. Appl. No. 17/850,112, filed Jun. 27, 2022, 41 pages, Nicira, Inc.
Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.
Non-Published Commonly Owned U.S. Appl. No. 18/197,090, filed May 14, 2023, 36 pages, Nicira, Inc.

\* cited by examiner

NETWORK-AWARE LOAD BALANCING

In recent years, several companies have brought to market solutions for deploying software-defined (SD) wide-area networks (WANs) for enterprises. Some such SD-WAN solutions use external third-party private or public cloud datacenters (clouds) to define different virtual WANs for different enterprises. These solutions typically have edge forwarding elements (called edge devices) at SD-WAN sites of an enterprise that connect with one or more gateway forwarding elements (called gateway devices or gateways) that are deployed in the third-party clouds.

In such a deployment, an edge device connects through one or more secure connections with a gateway, with these connections traversing one or more network links that connect the edge device with an external network. Examples of such network links include MPLS links, 5G LTE links, commercial broadband Internet links (e.g., cable modem links or fiber optic links), etc. The SD-WAN sites include branch offices (called branches) of the enterprise, and these offices are often spread across several different geographic locations with network links to the gateways of various different network connectivity types. Accordingly, load balancing in these deployments is often based on geo-proximity or measures of load on a set of load balanced destination machines. However, network links often exhibit varying network path characteristics with respect to packet loss, latency, jitter, etc., that can affect a quality of service or quality of experience. Such multi-site load balancing in SD-WAN implementation needs to be reliable and resilient.

BRIEF SUMMARY

Some embodiments of the invention provide a method for network-aware load balancing for data messages traversing a software-defined wide-area network (SD-WAN) (e.g., a virtual network) including multiple connection links (e.g., tunnels) between different elements of the SD-WAN (e.g., edge node forwarding elements, hubs, gateways, etc.). The method receives, at a load balancer in a multi-machine site of the SD-WAN, link state data relating to a set of SD-WAN datapaths including connection links of the multiple connection links. The load balancer, in some embodiments, uses the received link state to provide load balancing for data messages sent from a source machine in the multi-machine site to a set of destination machines (e.g., web servers, database servers, etc.) connected to the load balancer through the set of SD-WAN datapaths.

The load balancer receives a data message sent by the source machine in the multi-machine site to a destination machine in the set of destination machines. The load balancer selects, for the data message, a particular destination machine (e.g., a frontend machine for a set of backend servers) in the set of destination machines by performing a load balancing operation based on the received link state data. The data message is then forwarded to the selected particular destination machine in the set of destination machines. In addition to selecting the particular destination machine, in some embodiments, a particular datapath is selected to reach the particular destination machine based on the link state data.

In some embodiments, a controller cluster of the SD-WAN receives data regarding link characteristics from a set of elements (e.g., forwarding elements such as edge nodes, hubs, gateways, etc.) of the SD-WAN connected by the plurality of connection links. The SD-WAN controller cluster generates link state data relating to the plurality of connection links based on the received data regarding connection link characteristics. The generated link state data is then provided to the load balancer of the SD-WAN multi-machine site for the load balancer to use in making load balancing decisions.

In some embodiments, the controller cluster provides the link state data to SD-WAN elements, which in turn provide the link state data to their associated load balancers. These SD-WAN elements in some embodiments include SD-WAN devices that are collocated with the load balancers at the SD-WAN multi-machine sites. In other embodiments, the controller cluster provides the link state data directly to the load balancers at multi-machine sites, such as branch sites, datacenter sites, etc.

In some embodiments, the link state data is a set of criteria used to make load balancing decisions (e.g., a set of criteria specified by a load balancing policy). In other embodiments, the load balancer uses the link state data (e.g., statistics regarding aggregated load on each link) to derive a set of criteria used to make load balancing decisions. The set of criteria, in some embodiments, is a set of weights used in the load balancing process. In other embodiments, the link state data includes the following attributes of a connection link: packet loss, latency, signal jitter, a quality of experience (QoE) score, etc., that are included in the set of criteria used to make the load balancing decision or are used to derive the set of criteria (e.g., used to derive a weight used as a criteria).

In some embodiments, the load balancer also uses other load balancing criteria received from the destination machines or tracked at the load balancer, such as a CPU load, a memory load, a session load, etc. of the destination machine (or a set of backend servers for which the destination machine is a frontend). The link state data and the other load balancing criteria, in some embodiments, are used to generate a single weight for each destination machine. In other embodiments, the other load balancing criteria are used to calculate a first set of weights for each destination machine while the link state data is used to calculate a second set of weights for a set of datapaths to the set of destination machines.

In some embodiments, the link state data is generated for each connection link between elements of the SD-WAN, while in other embodiments the link state data is generated for each of a set of datapaths that are defined by a specific set of connection links used to traverse the SD-WAN elements connecting the load balancer and a particular destination machine (e.g., an SD-WAN edge node, frontend for a set of backend nodes, etc.) at a multi-machine site (e.g., private cloud datacenter, public cloud datacenter, software as a service (SaaS) public cloud, enterprise datacenter, branch office, etc.). In yet other embodiments, the link state data is generated for collections of datapaths connecting the load balancer and a particular data machine in the set of data machines. When the generated link state data relates to individual connection links, the load balancer, in some embodiments, derives the load balancing criteria for each datapath based on the link state data related to the individual connection links.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for network-aware load balancing for data messages traversing a software-defined wide-area network (SD-WAN) (e.g., a virtual network) including multiple connection links (e.g., tunnels, virtual private networks (VPNs), etc.) between different elements of the SD-WAN (e.g., edge node forwarding elements, hubs, gateways, etc.). The method receives, at a load balancer in a multi-machine site (e.g., a branch office, datacenter, etc.) of the SD-WAN, link state data relating to a set of SD-WAN datapaths, including link state data for the multiple connection links. The load balancer, in some embodiments, uses the provided link state to provide load balancing for data messages sent from a source machine in the multi-machine site to a set of destination machines (e.g., web servers, database servers, containers, pods, virtual machines, compute nodes, etc.) connected to the load balancer through the set of SD-WAN datapaths.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references, respectively, to the second data link layer, the third network layer, the fourth transport layer, and the seventh application layer of the OSI (Open System Interconnection) layer model.

Figure 1:
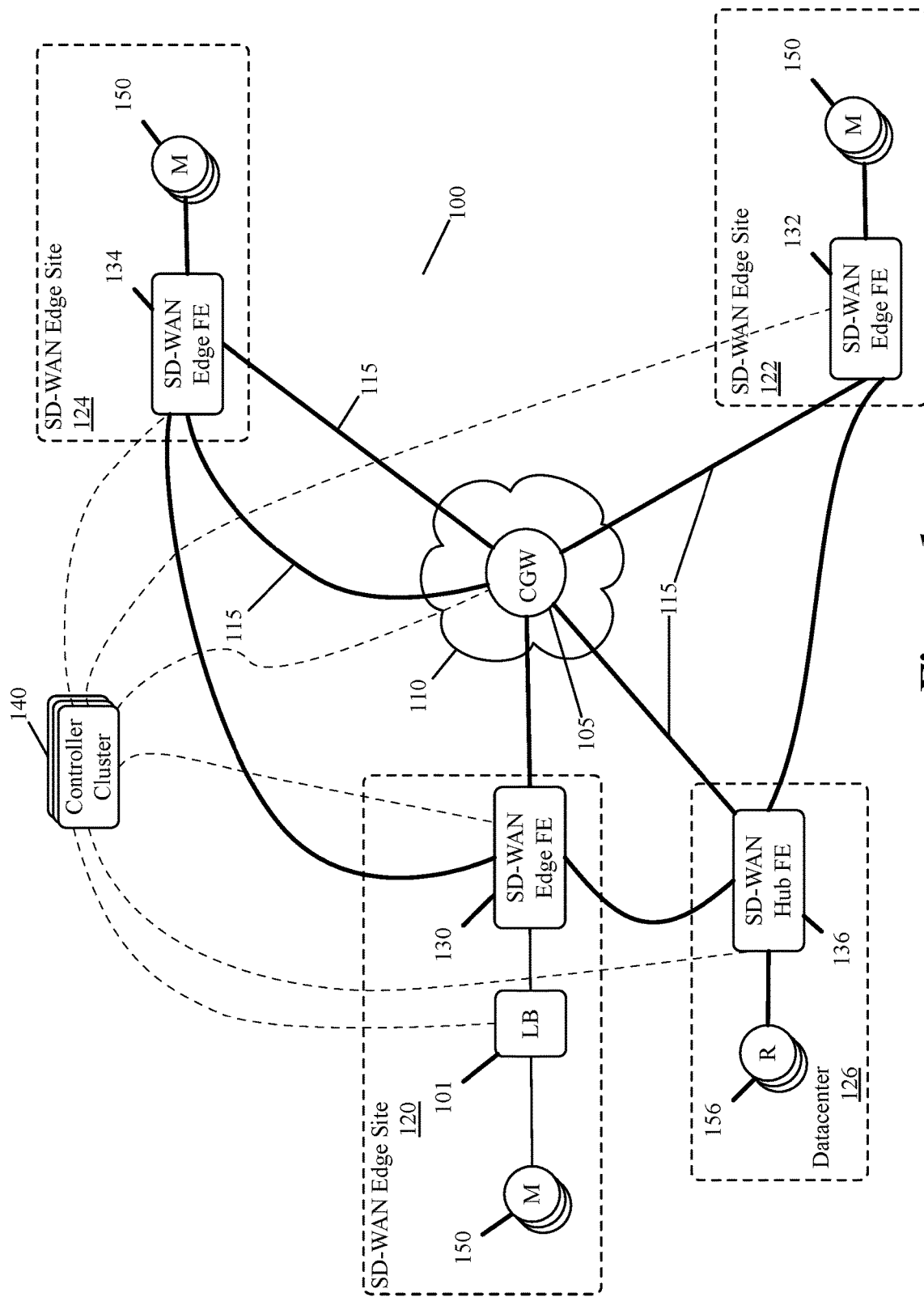
FIG. 1 illustrates an example of a virtual network that is created for a particular entity using a hub that is deployed in a public cloud datacenter of a public cloud provider.

FIG. 1 illustrates an example of a virtual network 100 that is created for a particular entity using SD-WAN forwarding elements deployed at branch sites, datacenters, and public clouds. Examples of public clouds are public clouds provided by Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc.

In FIG. 1, the SD-WAN forwarding elements include cloud gateway 105 and SD-WAN forwarding elements 130, 132, 134, 136. The cloud gateway (CGW) in some embodiments is a forwarding element that is in a private or public datacenter 110. The CGW 105 in some embodiments has secure connection links (e.g., tunnels) with edge forwarding elements (e.g., SD-WAN edge forwarding elements (FEs) 130, 132, 134, and 136) at the particular entity's multi-machine sites (e.g., SD-WAN edge sites 120, 122, and 124 with multiple machines 150), such as branch offices, datacenters, etc. These multi-machine sites are often at different physical locations (e.g., different buildings, different cities, different states, etc.) and are referred to below as multi-machine sites or nodes.

Four multi-machine sites 120-126 are illustrated in FIG. 1, with three of them being branch sites 120-124, and one being a datacenter 126. Each branch site is shown to include an edge forwarding node 130-134, while the datacenter site 126 is shown to include a hub forwarding node 136. The datacenter SD-WAN forwarding node 136 is referred to as a hub node because in some embodiments this forwarding node can be used to connect to other edge forwarding nodes of the branch sites 120-124. The hub node in some embodiments provides services (e.g., middlebox services) for packets that it forwards from one site to another branch site. The hub node also provides access to the datacenter resources 156, as further described below.

Each edge forwarding element (e.g., SD-WAN edge FEs 130-134) exchanges data messages with one or more cloud gateways 105 through one or more connection links 115 (e.g., multiple connection links available at the edge forwarding element). In some embodiments, these connection links include secure and unsecure connection links, while in other embodiments they only include secure connection links. As shown by edge node 134 and gateway 105, multiple secure connection links (e.g., multiple secure tunnels that are established over multiple physical links) can be established between one edge node and a gateway.

When multiple such links are defined between an edge node and a gateway, each secure connection link in some embodiments is associated with a different physical network link between the edge node and an external network. For instance, to access external networks, an edge node in some embodiments has one or more commercial broadband Internet links (e.g., a cable modem, a fiber optic link) to access the Internet, an MPLS (multiprotocol label switching) link to access external networks through an MPLS provider's network, a wireless cellular link (e.g., a 5G LTE network). In some embodiments, the different physical links between the edge node 134 and the cloud gateway 105 are the same type of links (e.g., are different MPLS links).

In some embodiments, one edge forwarding node 130-134 can also have multiple direct links 115 (e.g., secure connection links established through multiple physical links) to another edge forwarding node 130-134, and/or to a datacenter hub node 136. Again, the different links in some embodiments can use different types of physical links or the same type of physical links. Also, in some embodiments, a first edge forwarding node of a first branch site can connect to a second edge forwarding node of a second branch site (1) directly through one or more links 115, or (2) through a cloud gateway or datacenter hub to which the first edge forwarding node connects through two or more links 115. Hence, in some embodiments, a first edge forwarding node (e.g., 134) of a first branch site (e.g., 124) can use multiple SD-WAN links 115 to reach a second edge forwarding node (e.g., 130) of a second branch site (e.g., 120), or a hub forwarding node 136 of a datacenter site 126.

The cloud gateway 105 in some embodiments is used to connect two SD-WAN forwarding nodes 130-136 through at least two secure connection links 115 between the gateway 105 and the two forwarding elements at the two SD-WAN sites (e.g., branch sites 120-124 or datacenter site 126). In some embodiments, the cloud gateway 105 also provides network data from one multi-machine site to another multi-machine site (e.g., provides the accessible subnets of one site to another site). Like the cloud gateway 105, the hub forwarding element 136 of the datacenter 126 in some embodiments can be used to connect two SD-WAN forwarding nodes 130-134 of two branch sites through at least two secure connection links 115 between the hub 136 and the two forwarding elements at the two branch sites 120-124.

In some embodiments, each secure connection link between two SD-WAN forwarding nodes (i.e., CGW 105 and edge forwarding nodes 130-136) is formed as a VPN (virtual private network) tunnel between the two forwarding nodes. In this example, the collection of the SD-WAN forwarding nodes (e.g., forwarding elements 130-136 and gateways 105) and the secure connections 115 between the forwarding nodes forms the virtual network 100 for the particular entity that spans at least public or private cloud datacenter 110 to connect the branch and datacenter sites 120-126.

In some embodiments, secure connection links are defined between gateways in different public cloud datacenters to allow paths through the virtual network to traverse from one public cloud datacenter to another, while no such links are defined in other embodiments. Also, in some embodiments, the gateway 105 is a multi-tenant gateway that is used to define other virtual networks for other entities (e.g., other companies, organizations, etc.). Some such embodiments use tenant identifiers to create tunnels between a gateway and edge forwarding element of a particular entity, and then use tunnel identifiers of the created tunnels to allow the gateway to differentiate data message flows that it receives from edge forwarding elements of one entity from data message flows that it receives along other tunnels of other entities. In other embodiments, gateways are single-tenant and are specifically deployed to be used by just one entity.

FIG. 1 illustrates a cluster of controllers 140 that serves as a central point for managing (e.g., defining and modifying) configuration data that is provided to the edge nodes and/or gateways to configure some or all of the operations. In some embodiments, this controller cluster 140 is in one or more public cloud datacenters, while in other embodiments it is in one or more private datacenters. In some embodiments, the controller cluster 140 has a set of manager servers that define and modify the configuration data, and a set of controller servers that distribute the configuration data to the edge forwarding elements (FEs), hubs and/or gateways. In some embodiments, the controller cluster 140 directs edge forwarding elements and hubs to use certain gateways (i.e., assigns a gateway to the edge forwarding elements and hubs). The controller cluster 140 also provides next hop forwarding rules and load balancing criteria in some embodiments.

Figure 2:
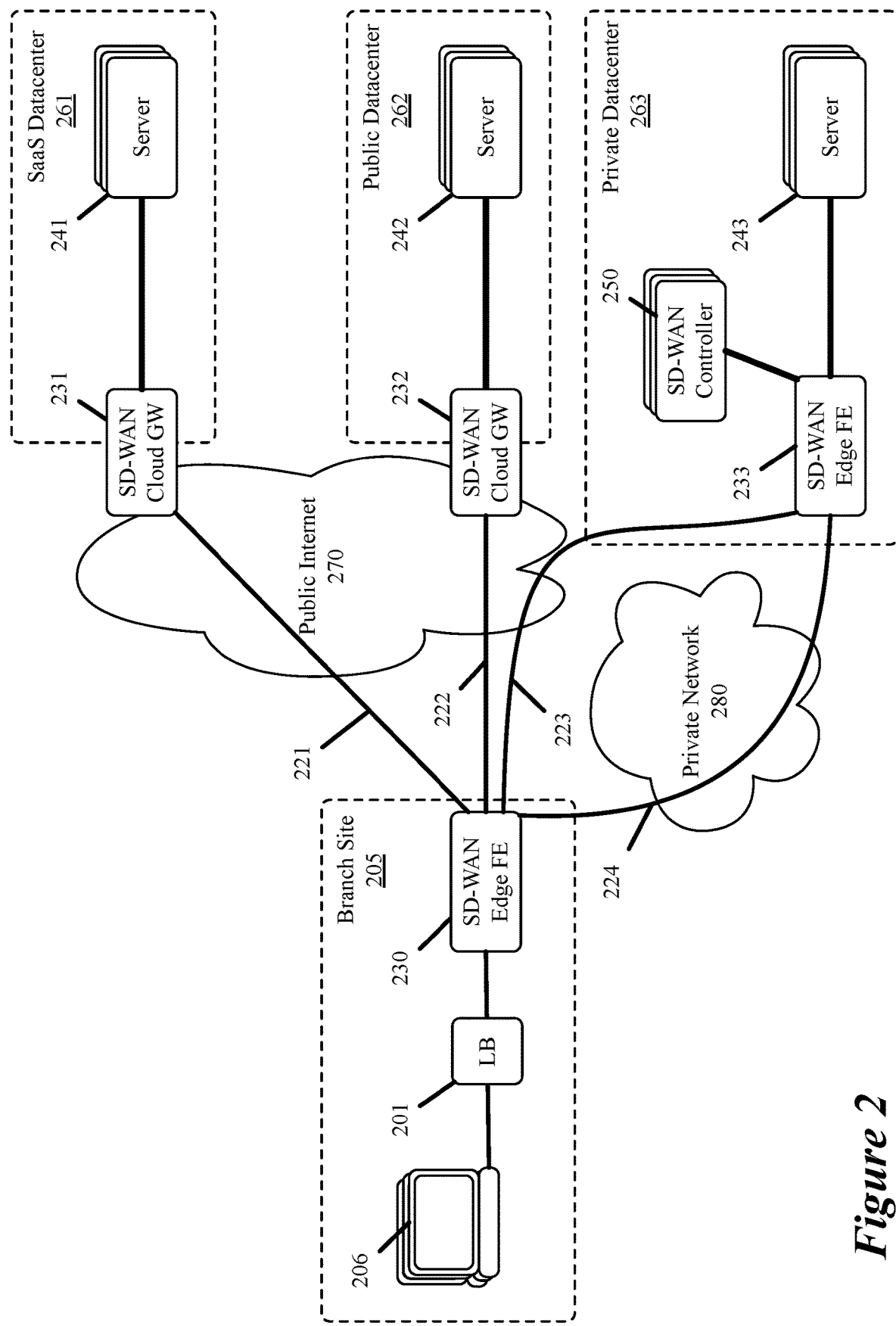
FIG. 2 illustrates a first multi-machine site hosting a set of machines that connect to a set of destination machines in a set of multi-machine SD-WAN sites.

FIG. 2 illustrates a branch multi-machine site 205 hosting a set of machines 206 that connects to a set of destination machines (e.g., servers 241-243) in a set of other multi-machine sites 261-263, which in this example are all datacenters. The connections are made through a load balancer 201, an SD-WAN edge FE 230, and a set of connection links 221-224 to SD-WAN cloud gateways 231-232 and SD-WAN edge FE 233 (collectively, "SD-WAN edge devices"). In some embodiments, SD-WAN cloud gateways 231 and 232 are multi-tenant SD-WAN edge devices deployed at a public cloud datacenter to provide SD-WAN services to software as a service (SaaS), infrastructure as a service (IaaS), and cloud network services as well as access to private backbones.

In some embodiments, the CGW 232 is deployed in the same public datacenter 262 as the servers 242, while in other embodiments it is deployed in another public datacenter. Similarly, in some embodiments, the CGW 231 is deployed in the same public datacenter 261 as the servers 241, while in other embodiments it is deployed in another public datacenter. As illustrated, connection links 221-223 utilize public Internet 270, while connection link 224 utilizes a private network 280 (e.g., an MPLS provider's network). The connection links 221-224, in some embodiments, are secure tunnels (e.g., IPSec tunnels) used to implement a virtual private network.

FIG. 2 also illustrates a set of one or more SD-WAN controllers 250 executing at the private datacenter 263. Like controller cluster 140 of FIG. 1, the set of SD-WAN controllers 250 manage a particular SD-WAN implemented by connection links 221-224. In some embodiments, the set of SD-WAN controllers 250 receive data regarding link characteristics of connection links (e.g., connection links 221-224) used to implement the SD-WAN from elements (e.g., SD-WAN edge devices 230-233) of the SD-WAN connected by the connection links. The set of SD-WAN controllers 250 generate link state data relating to the connection links based on the received data regarding connection link characteristics. The generated link state data is then provided to the load balancer 201 of the SD-WAN multi-machine site 205 for the load balancer to use in making load balancing decisions. The specific operations at the set of controllers 250 and the load balancer 201 will be explained below in more detail in relation to FIGS. 4-6.

Figure 3:
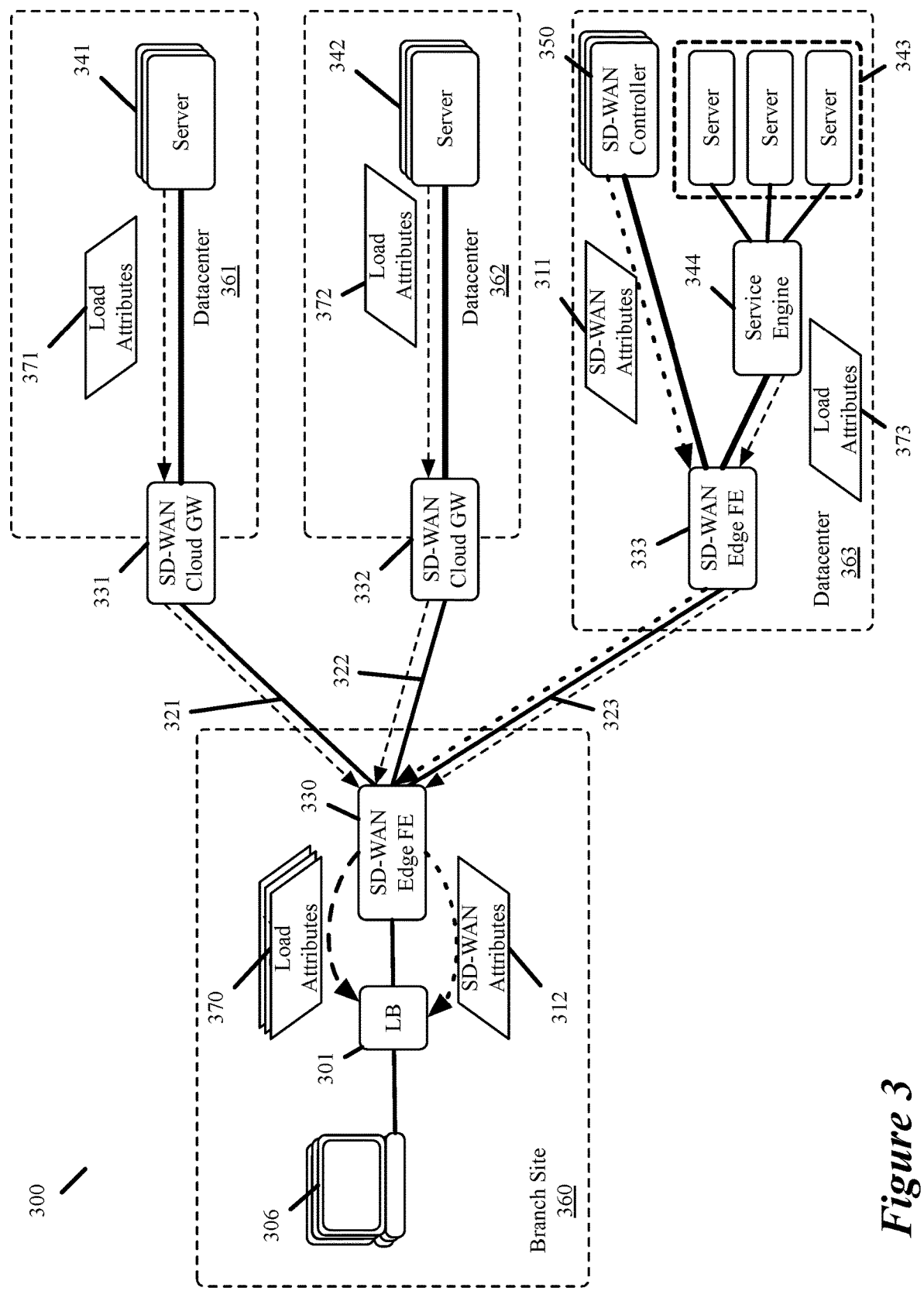
FIG. 3 illustrates a network in which a load balancing device receives load attribute data from sets of servers (e.g., destination machines) and a set of SD-WAN attributes (e.g., link state data) from an SD-WAN edge forwarding element based on a set of SD-WAN attributes sent from a set of SD-WAN controllers.

FIG. 3 illustrates a network 300 in which a load balancing device 301 receives (1) load attribute data 370 (e.g., including load attributes 371-373) relating to the load on the sets of servers 341-343 (which are the destination machines in this example) and (2) a set of SD-WAN attributes 312 (e.g., link state data) from SD-WAN edge FE 330 based on a set of SD-WAN attributes 311 sent from a set of SD-WAN controllers 350. In some embodiments, the SD-WAN attributes 311 and 312 are identical, while in other embodiments, the SD-WAN edge FE 330 modifies SD-WAN attributes 311 to generate link state data for consumption by the local load balancer 301.

Load attributes 371-373, in some embodiments, are sent to SD-WAN controller 350 for this controller to aggregate and send to the load balancing device 301. In some embodiments, the SD-WAN controller 350 generates weights and/or other load balancing criteria from the load attributes that it receives. In these embodiments, the controller 350 provides the generated weights and/or other load balancing criteria to the load balancer 301 to use in performing its load balancing operations to distribute the data message load among the SD-WAN datacenter sites 361-363. In other embodiments, the load balancing device 301 generates the weights and/or other load balancing criteria from the load attributes 370 that it receives from non-controller modules and/or devices at datacenter sites 361-363, or receives from the controller 350.

Network 300 includes four edge forwarding elements 330-333 that connect four sites 360-363 through an SD-WAN established by these forwarding elements and the secure connections 321-323 between them. In the illustrated embodiment, the SD-WAN edge devices 331 and 332 serve as frontend load-balancing devices for the backend servers 341 and 342, respectively, and are identified as the destination machines (e.g., by virtual IP addresses associated with their respective sets of servers).

In some embodiments, an SD-WAN edge forwarding element (e.g., SD-WAN edge FE 333) provides a received data message destined for its associated local set of servers (e.g., server set 343) to a local load balancing service engine (e.g., service engine 344) that provides the load balancing service to distribute data messages among the set of servers 343. Each set of servers 341-343 is associated with a set of load balancing weights $LW_{341}$-$LW_{343}$, which represent the collective load on the servers of each server set. The load balancer 301 uses the load balancing weights to determine how to distribute the data message load from a set of machines 306 among the different server sets 341-343.

In addition, the load balancing device for each server set (e.g., the CGW 331 or service engine 344 for the server set 341 or 343) in some embodiments uses another set of load balancing weights (e.g., one that represents the load on the individual servers in the server set) to determine how to distribute the data message load among the servers in the set (e.g., by performing based on the weights in the set a round robin selection of the servers in the set for successive flows, in the embodiments where different weights in the set are associated with different servers).

In different embodiments, the load attributes 371-373 are tracked differently. For instance, in some embodiments, the servers 341-343 track and provide the load attributes. In other embodiments, this data is tracked and provided by load tracking modules that execute on the same host computers as the servers, or that are associated with these computers. In still other embodiments, the load attributes are collected by the load balancing devices and/or modules (e.g., CGW 331 or service engine 344) that receive the data messages forwarded by the load balancer 301 and that distribute these data messages amongst the servers in their associated server set.

Figure 4:
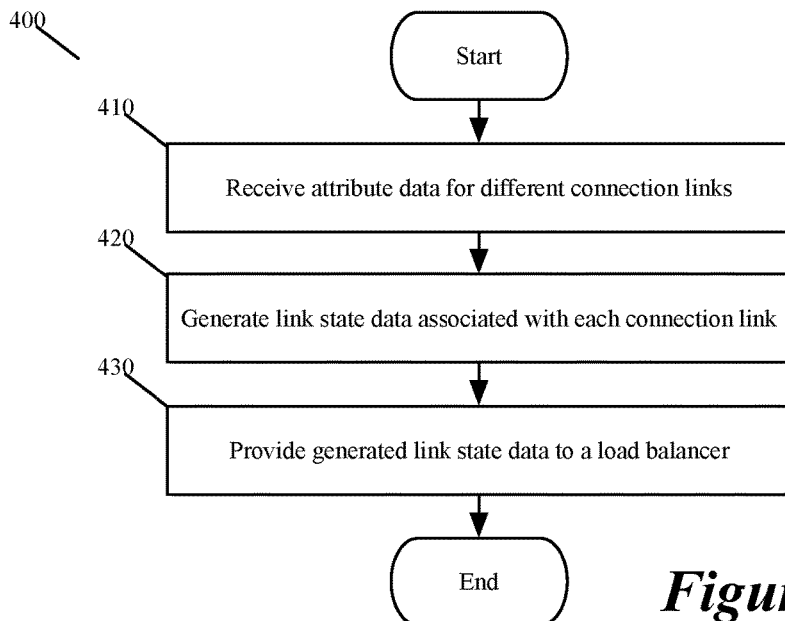
FIG. 4 conceptually illustrates a process for generating link state data and providing the link state data to a load balancer in an SD-WAN.

FIG. 4 conceptually illustrates a process 400 for generating link state data and providing the link state data to one or more load balancers in an SD-WAN. Process 400, in some embodiments, is performed by an SD-WAN controller or a set of SD-WAN controllers (e.g., SD-WAN controllers 250 or 350). The process 400 begins by receiving (at 410) connection link attribute data from a set of SD-WAN elements (e.g., SD-WAN edge FEs, gateways, hubs, etc.) at one or more multi-machine sites. In some embodiments, the connection link attributes are received based on a request from the set of SD-WAN controllers or a long-pull operation established with each SD-WAN element to be notified of changes to connection link attributes. The connection link attributes, in some embodiments, include at least one of a measure of latency, a measure of loss, a measure of jitter, and a measure of a quality of experience (QoE).

The process 400 then generates (at 420) link state data associated with each connection link associated with the received link state data. The link state data, in some embodiments, is aggregate link state data for a set of connection links connecting a pair of SD-WAN elements (e.g., SD-WAN edge FEs, hubs, and gateways). For example, in some embodiments, an SD-WAN edge FE connects to an SD-WAN gateway using multiple connection links (e.g., a public internet connection link, an MPLS connection link, a wireless cellular link, etc.) that the SD-WAN may use to support a particular communication between a source machine and a destination machine in the set of destination machines (e.g., by using multiple communication links in the aggregate set for a same communication session to reduce the effects of packet loss along either path). Accordingly, the aggregate link state data, in such an embodiment, reflects the characteristics of the set of connection links as it is used by the SD-WAN edge FE to connect to the SD-WAN gateway.

In some embodiments, the link state data includes both current and historical data (e.g., that a particular connection link flaps every 20 minutes, that a particular connection link latency increases during a particular period of the day or week, etc.). In some embodiments, the historical data is incorporated into a QoE measure, while in other embodiments, the historical data is used to provide link state data (e.g., from the SD-WAN edge FE) that reflects patterns in connectivity data over time (e.g., increased latency or jitter during certain hours, etc.).

In some embodiments, the link state data is a set of criteria that includes criteria used by a load balancer to make load balancing decisions. The set of criteria, in some embodiments, includes a set of weights that are used by the load balancer in conjunction with a set of weights based on characteristics of the set of destination machines among which the load balancer balances. In some embodiments, the set of criteria provided as link state data are criteria specified in a load balancing policy. In other embodiments, the link state data is used by the load balancer to generate criteria (e.g., weights) used to perform the load balancing. The use of the link state data in performing the load balancing operation is discussed in more detail in relation to FIG. 5.

The generated link state data is then provided (at 430) to one or more load balancers (or set of load balancers) at one or more SD-WAN sites. In some embodiments, the set of SD-WAN controllers provides (at 430) the generated link state data to an SD-WAN element (e.g., a collocated SD-WAN edge FE) that, in turn provides the link state data to the load balancer. The generated link state data provided to a particular load balancer, in some embodiments, includes only link state data that is relevant to a set of connection links used to connect to a set of destination machines among which the load balancer distributes data messages (e.g., excluding "dead-end" connection links from a hub or gateway to an edge node not executing on a destination machine in the set of destination machines).

Process 400 ends after providing (at 430) the generated link state data to one or more load balancers at one or more SD-WAN sites. The process 400 repeats (i.e., is performed periodically or iteratively) based on detected events (e.g., the addition of a load balancer, the addition of an SD-WAN element, a connection link failure, etc.), according to a schedule, or as attribute data is received from SD-WAN elements.

Figure 5:
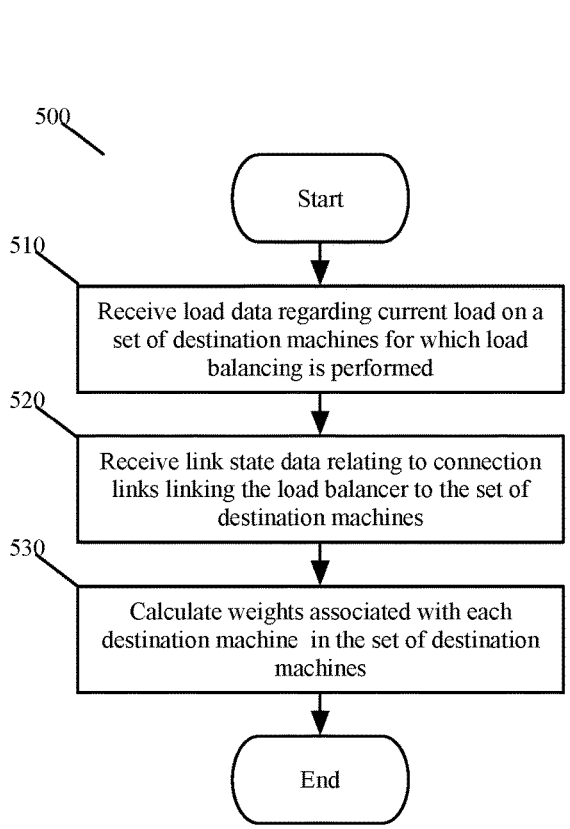
FIG. 5 conceptually illustrates a process for calculating a set of load balancing criteria based on a set of received link state data and destination machine load attributes.

FIG. 5 conceptually illustrates a process 500 for calculating a set of load balancing criteria based on a set of received link state data and destination machine load attributes. Process 500, in some embodiments, is performed by a load balancer (e.g., load balancer 301) at an SD-WAN site. In other embodiments, this process is performed by a server or controller associated with this load balancer (e.g., load balancer 301). In some embodiments, this server or controller executes on the same device (e.g., same computer) as the load balancer (e.g., load balancer 301), or executes on a device in the same datacenter as the load balancer (e.g., load balancer 301).

Process 500 begins by receiving (at 510) load data regarding a current load on a set of candidate destination machines (e.g., a set of servers associated with a virtual IP (VIP) address) from which the load balancer selects a destination for a particular data message flow. The load data, in some embodiments, includes information relating to a CPU load, a memory load, a session load, etc., for each destination machine in the set of destination machines.

In some embodiments, a load balancer maintains information regarding data message flows distributed to different machines in the set of destination machines, and additional load data is received from other load balancers at the same SD-WAN site or at different SD-WAN sites that distribute data messages among the same set of destination machines. Examples of a distributed load balancer (implemented by a set of load balancing service engines) is provided in FIGS. 11 and 12. Conjunctively or alternatively, load data (or a capacity used to calculate load data) in some embodiments is received from the set of destination machines.

The process 500 also receives (at 520) link state data relating to connection links linking the load balancer to the set of destination machines. As described above, in some embodiments, the link state data is a set of criteria that are specified in a load balancing policy. For example, in some embodiments, a load balancing policy may specify calculating a single weight for each destination machine based on a set of load measurements and a set of connectivity measurements. In other embodiments, a load balancing policy may specify calculating a first load-based weight and a second connectivity-based weight. In either of these embodiments the set of connectivity measurements is, or is based on, the received link state data. The weights, in some embodiments, are used to perform a weighted round robin or other similar weight-based load balancing operation. One of ordinary skill in the art will appreciate that receiving the load data and link state data, in some embodiments, occurs in a different order, or each occurs periodically, or each occurs based on different triggering events (e.g., after a certain number of load balancing decisions made by a related load balancer, upon a connection link failure, etc.).

After receiving the load and link state data, the process 500 calculates (at 530) a set of weights for each destination machine. In some embodiments, the set of weights for a particular destination machine includes a first load-based weight and a second connectivity-based weight. An embodiment using two weights is discussed below in relation to FIG. 6. In some embodiments, the load data and the link state data are used to generate a single weight associated with each destination machine. In other embodiments, the load balancer uses the link state data to identify multiple possible paths (e.g., datapaths) for reaching a particular destination machine, calculates a weight associated with each datapath based on the load data and the link state data for connection links that make up the path, and treats each path as a potential destination as in table 760B of FIG. 7 discussed below. A load balancer, in some embodiments, then performs a round robin operation based on the calculated weights (e.g., a weighted round robin).

Figure 6:
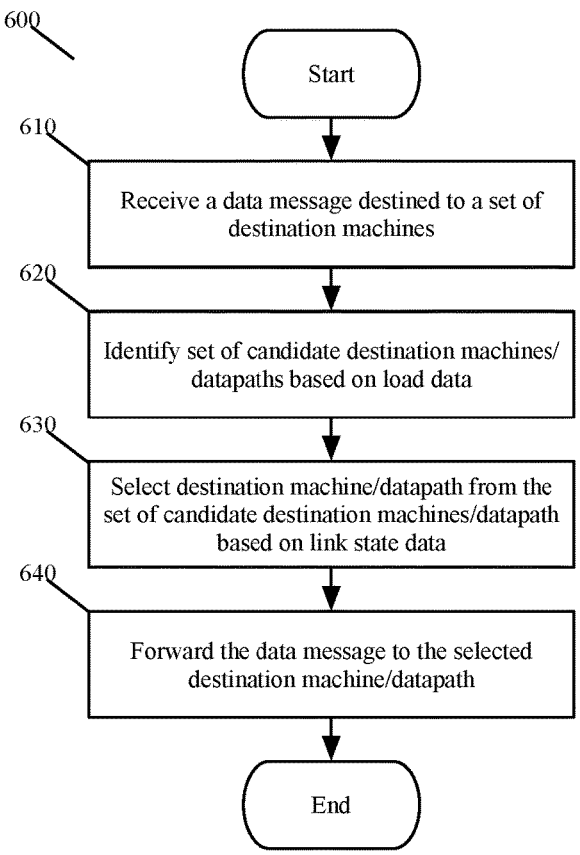
FIG. 6 conceptually illustrates a process used in some embodiments to provide load balancing for a set of destination machines.

FIG. 6 conceptually illustrates a process 600 used in some embodiments to provide load balancing for a set of destination machines. Process 600 is performed, in some embodiments, by each load balancer in an SD-WAN site that selects particular destination machines from a set of destination machines at another SD-WAN site. In some embodiments, a load balancer operating at a particular edge site performs the load balancing operation before providing a data message to a collocated SD-WAN edge FE at the edge site.

As illustrated in FIG. 3, the set of destination machines can be distributed across several sites 361-363, and a load balancer associated with each of these sites can then select one destination machine at each of these sites after the process 600 selects one of these sites. Alternatively, the process 600 in some embodiments selects individual destination machines at some sites, while having a load balancer at another site select individual destination machines at that site. In still other embodiments, the process 600 selects individual destination machines at each other site, rather than having another load balancer associated with each other site select any amongst the destination machines at those sites.

The process 600 begins by receiving (at 610) a data message destined to a set of machines. In some embodiments, the data message is addressed to a VIP that is associated with the set of destination machines or is a request (e.g., a request for content) associated with the set of destination machines. The set of destination machines includes a subset of logically grouped machines (e.g., servers, virtual machines, Pods, etc.) that appear to the load balancer as a single destination machine at a particular location (e.g., SD-WAN site, datacenter, etc.).

The process 600 then identifies (at 620) a set of candidate destination machines or datapaths based on the load data relating to the set of destination machines. In some embodiments, the identified set of candidate destination machines (or datapaths) is based on a weight that relates to a load on the destination machines. For example, in an embodiment that uses a least connection method of load balancing, the set of candidate destination machines is identified as the set of "n" destination machines with the fewest number of active connections. One of ordinary skill in the art will appreciate that the least connection method is one example of a load balancing operation based on selecting a least-loaded destination machine and that other measures of load can be used as described in relation to the least connection method.

In some embodiments, the value of "n" is an integer that is less than the number of destination machines in the set of destination machines. The value of "n" is selected, in some embodiments, to approximate a user-defined or default fraction (e.g., 10%, 25%, 50%, etc.) of the destination machines. Instead of using a fixed number of candidate destination machines, some embodiments identify a set of candidate machines based on a load-based weight being under or over a threshold that can be dynamically adjusted based on the current load-based weights. For example, if the least-loaded destination is measured to have a weight "$W_{LL}$" (e.g., representing using 20% of its capacity) the candidate destination machines may be identified based on being within a certain fixed percentage (P) of the weight (e.g., $W_{LL} < W_{CDM} < W_{LL}$ P) or being no more than some fixed factor (A) times the weight of the least-loaded destination machine (e.g., $W_{LL} < W_{CDM} < A*W_{LL}$), where A is greater than 1. Similarly, if a load-based weight measures excess capacity, a minimum threshold can be calculated by subtraction by P or division by A in the place of the addition and multiplication used to calculate upper thresholds.

In some embodiments, identifying the set of candidate destination machines includes identifying a set of candidate datapaths associated with the set of candidate destination machines. In some such embodiments, a set of datapaths to reach the candidate destination machine is identified for each candidate destination machine. Some embodiments identify only a single candidate destination machine (e.g., identify the least-loaded destination machine) and the set of candidate datapaths includes only the datapaths to the single candidate destination machine.

After identifying (at 620) the set of candidate destination machines or datapaths based on the load data, a destination machine or datapath for the data message is selected (at 630) based on the link state data. In some embodiments, the link state data is a connectivity-based weight calculated by an SD-WAN and provided to the load balancer. In other embodiments, the link state data includes data regarding link characteristics that the load balancer uses to calculate the connectivity-based weight. Selecting the destination machine for a data message, in some embodiments, includes selecting the destination machine associated with a highest (or lowest) connectivity-based weight in the set of candidate destination machines. The connectivity-based weight, in some embodiments, is based on at least one of a measure of latency, a measure of loss, or a measure of jitter. In some embodiments, the connectivity-based weight is based on a QoE measurement based on some combination of connection link attribute data (e.g., if provided by the set of controllers) or link state data for one or more connection links (e.g., a set of connection links between a source edge node and a destination machine, a set of connection links making up a datapath, etc.).

The data message is then forwarded (at 640) to the selected destination machine and, in some embodiments, along the selected datapath. In some embodiments that select a particular datapath, a collocated SD-WAN edge FE provides the load balancer with information used to distinguish between different datapaths. In some embodiments in which the destination machine is selected but the datapath is not, the SD-WAN edge FE performs a connectivity optimization process to use one or more of the connection links that can be used to communicate with the destination machine.

Figure 7:
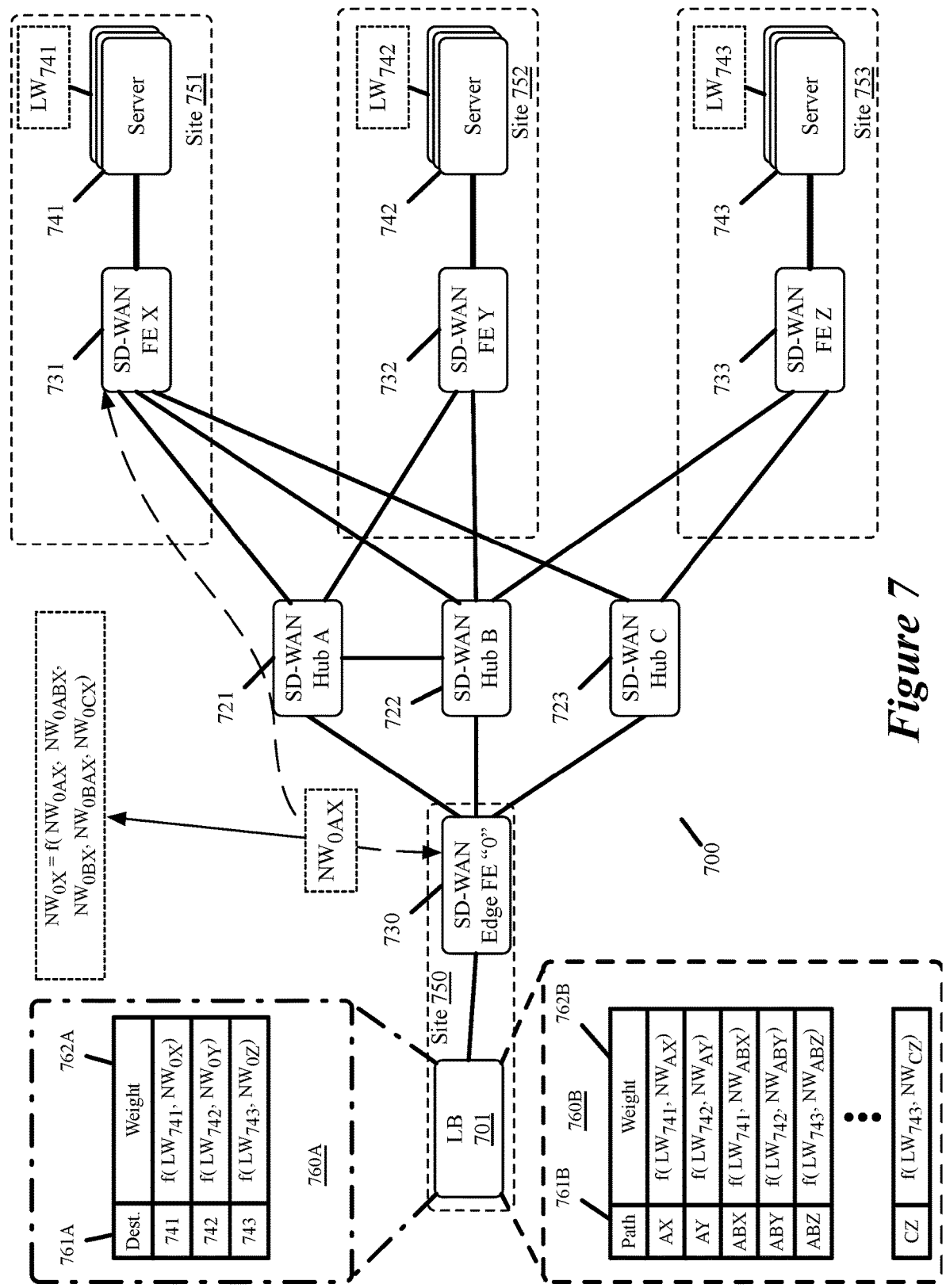
FIG. 7 illustrates a network in which a load balancing device uses a single weight associated with each of a set of destination machines (or datapaths) located at multiple SD-WAN sites to select a destination machine for each received data message.

FIGS. 7-12 illustrate embodiments implementing network-aware load balancing as described above. FIG. 7 illustrates a network 700 in which a load balancer 701 uses a single weight associated with each of a set of destination machines (e.g., server clusters 741-743 or datapaths) located at multiple SD-WAN sites 751-753 to select a SD-WAN site for each received data message. Network 700 includes four SD-WAN sites 750-753 associated with SD-WAN edge forwarding nodes 730-733. In the illustrated embodiment the SD-WAN FEs 731-733 serve as frontend load balancers for the backend servers 741-743, respectively, and are identified as the destination machines. In other embodiments, the backend servers are directly selected by the load balancer 701.

Each set of servers 741-743 is associated with a set of load balancing weights that are used in some embodiments by the front end load balancing forwarding nodes 731-733 to distribute the data message load across the servers of their associated server sets 741-743. Each server set 741-743 is also associated with a set of load balancing weights $LW_{741}$-$LW_{743}$ that are used by the load balancer 701 to distribute the data message load among the different server sets. In some embodiments, the load balancing weights are derived from the set of load data (e.g., CPU load, memory load, session load, etc.) provided to, or maintained, at the load balancer 701. Also, in some embodiments, the load balancing weights $LW_{741}$-$LW_{743}$ represent the collective load among the servers of each server set, while the load balancing weights used by the forwarding nodes 731-733 represents the load among the individual servers in each server set associated with each forwarding node.

The network 700 also includes a set of SD-WAN hubs 721-723 that facilitate connections between SD-WAN edge forwarding nodes 730-733 in some embodiments. SD-WAN hubs 721-723, in some embodiments, execute in different physical locations (e.g., different datacenters) while in other embodiments some or all of the SD-WAN hubs 721-723 are in a single hub cluster at a particular physical location (e.g., an enterprise datacenter). SD-WAN hubs 721-723, in the illustrated embodiment, provide connections between the SD-WAN edge forwarding nodes 730-733 of the SD-WAN sites. In this example, communications between SD-WAN forwarding nodes have to pass through an SD-WAN hub so that data messages receive services (e.g., firewall, deep packet inspection, other middlebox services, etc.) provided at the datacenter in which the hub is located. In other embodiments (e.g., the embodiments illustrated in FIGS. 2, 3, and 10), edge forwarding nodes have direct node-to-node connections, and communication between pairs of such nodes uses these connections and does not pass through any intervening hub or CGW.

The load balancer 701 receives the load balancing data (i.e., load weights $LW_{741}$-$LW_{743}$) and link state data (e.g., network weights (NW)) for the connection links between the SD-WAN elements. The link state data, as described above in relation to FIGS. 4 and 5, is either a set of network weights or is used to calculate the set of network weights used by the load balancer. The link state data is generated differently in different embodiments. For instance, in some embodiments, it is generated by link-state monitors associated with the edge forwarding nodes 730-733 (e.g., monitors at the same location or executing on the same computers as the forwarding nodes), while in other embodiments, it is generated by the SD-WAN controllers.

FIG. 7 illustrates two different load balancing embodiments using load balancing information 760A and 760B that include a list of destination machines 761A and 761B, respectively, and a list of weights 762A and 762B, respectively, associated with (1) the list of destination machines, which in this example are server sets 741-743, and (2) the list of paths to the destination machines. As indicated by the function notation in the tables 762A and 762B, the weight in lists 762A and 762B are a function of a load weight and a network weight for a particular destination machine.

Between the edge forwarding element 730 and a destination edge forwarding element associated with a selected server set, there can be multiple paths through multiple links of the edge forwarding element 730 and multiple hubs. For instance, there are three paths between the forwarding elements 730 and 731 through hubs 721-723. If the forwarding element 730 connects to one hub through multiple physical links (e.g., connects to hub 721 through two datapaths using two physical links of the forwarding element 730), then multiple paths would exist between the forwarding elements 730 and 731 through the multiple datapaths (facilitated by the multiple physical links of the forwarding element 730) between the forwarding element 730 and the hub 721.

As mentioned above, the load balancers use different definitions of a destination machine in different embodiments. Load balancing information 760A defines destination machines using the edge nodes 731-733 (representing the sets of servers 741-743) such that a particular edge node (e.g., the edge node 731) is selected. The particular edge node is selected based on a weight that is a function of a load weight (e.g., $LW_{741}$) associated with the edge node and a network weight (e.g., $NW_{OX}$) associated with a set of datapaths available to reach the edge node. The network weight (e.g., $NW_{OX}$) in turn is a function of a set of network weights associated with each connection link or set of connection links available to reach the destination machine.

For example, to calculate the network weight $NW_{OX}$, a load balancer, SD-WAN controller, or SD-WAN edge FE determines all the possible paths to the SD-WAN node 731 and calculates a network weight for each path based on link state data received regarding the connection links that make up the possible paths. Accordingly, $NW_{OX}$ is illustrated as a function of network weights $NW_{OAX}$, $NW_{OABX}$, $NW_{OBX}$, $NW_{OBAX}$, and $NW_{OCX}$ calculated for each connection link based on link state data. The link state data for a particular connection link, in some embodiments, reflects not only the characteristics of the intervening network but also reflects the functionality of the endpoints of the connection link (e.g., an endpoint with an overloaded queue may increase the rate of data message loss, jitter, or latency). In some embodiments, the link state data is used directly to calculate the network weight $NW_{OX}$ instead of calculating intermediate network weights.

Load balancing information 760B defines destination machines using the datapaths to edge nodes 731-733 (representing the sets of servers 741-743) such that a particular datapath to a particular edge node is selected. The particular datapath is selected based on a weight (e.g., a destination weight) that is a function of a load weight (e.g., $LW_{741}$) associated with the particular edge node that the datapath connects to the source edge node and a network weight (e.g., $NW_{OCX}$) associated with the particular datapath. The network weight (e.g., $NW_{OAX}$), in turn is a function of a set of network weights associated with each connection link that define the particular datapath.

For example, to calculate the network weight $NW_{OCX}$, a load balancer, SD-WAN controller, or SD-WAN edge FE determines the communication links used in the datapath to the SD-WAN node 731 and calculates a network weight (e.g., $NW_{OA}$ and $NW_{AX}$) for each path based on link state data received regarding the connection links that make up the datapath. In some embodiments, the link state data is used directly to calculate the network weight $NW_{OCX}$ instead of calculating intermediate network weights. In some embodiments, the weight is also affected by the number of possible paths such that a capacity of a destination machine (e.g., set of servers) reflected in the weight value also reflects the fact that the same set of servers is identified by multiple destination machines defined by datapaths.

Under either approach, the use of network characteristics (e.g., link state data) that would otherwise be unavailable to the load balancer allows the load balancer to make better decisions than could be made without the network information. For instance, a load balancing operation based on a least connection method (e.g., based on the assumption that it has the most capacity) without network information may identify a destination machine that is connected by a connection link (or set of connection links) that is not reliable or has lower capacity than the destination machine. In such a situation, the real utilization of the available resources is higher than that reflected by the number of connections, and without network information would be identified as having a higher capacity than a different destination machine that has more capacity when the network information is taken into account. Accordingly, reliability, speed, and QoE of the links between a load balancer and a destination machine can be considered when making a load balancing decision.

Figure 8:
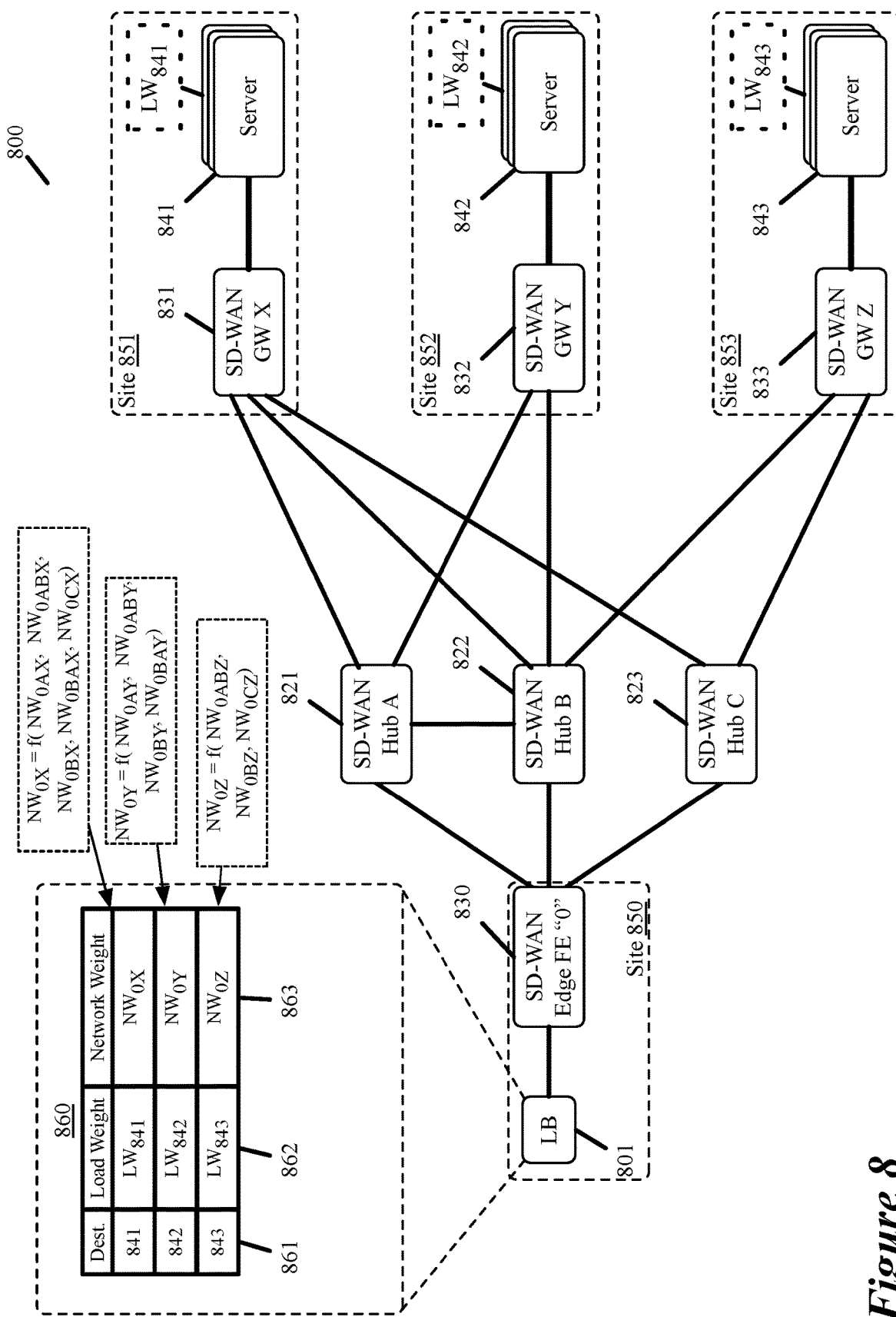
FIG. 8 illustrates a network in which a load balancing device uses a load weight and a network weight associated with each of a set of destination machines located at multiple SD-WAN sites to select a destination machine for each received data message.

FIG. 8 illustrates a network 800 in which a load balancing device 801 uses a load weight 862 and a network weight 863 associated with each of a set of destination machines 861 (e.g., server clusters 841-843) located at multiple SD-WAN sites to select a destination machine for each received data message. The network 800 includes four edge nodes 830-833 associated with four SD-WAN sites 850-853. In the illustrated embodiment the SD-WAN forwarding nodes 831-833 serve as frontend devices for the backend servers 841-843, respectively, and are identified as the destination machines. Each set of servers 841-843 is associated with a load weight $LW_{841}$-$LW_{843}$ which in some embodiments represents a set of load data (e.g., CPU load, memory load, session load, etc.) provided to, or maintained at, the load balancer 801.

The network 800 also includes a set of SD-WAN hubs 821-823 that facilitate connections between SD-WAN edge devices in some embodiments. As in FIG. 7, SD-WAN hubs 821-823, in some embodiments, execute in different physical locations (e.g., different datacenters) while in other embodiments two or more of SD-WAN hubs 821-823 are in a single hub cluster at a particular physical location (e.g., an enterprise datacenter). SD-WAN hubs 821-823, in the illustrated embodiment, serve as interconnecting hubs for the connections between the SD-WAN edge devices 830-833.

The load balancer 801 receives the load balancing data 860 (i.e., load weights $LW_{841}$-$LW_{843}$) and link state data (e.g., network weights (NW)) for the connection links between the SD-WAN elements. The load balancing information 860 defines destination machines using the edge nodes 831-833 (representing the sets of servers 841-843) such that a particular edge node (e.g., the edge node 831 associated with server set 841) is selected. Specifically, the load balancer 801 uses both the load balancing data and link state data as weight values for performing its selection of the different server sets as the different destinations for the different data message flows.

In some embodiments, the load balancer 801 produces an aggregate weight from both of the network and load weights NW and LW associated with a server set, and then uses the aggregated weights to select a server set among the server sets for a data message flow. In other embodiments, it does not generate aggregate weight from the network and load weights but uses another approach (e.g., uses the network weights as constraints to eliminate one or more of the server sets when the SD-WAN connections to the server sets are unreliable).

The link state data, as described above in relation to FIGS. 4 and 5, is either a set of network weights or is used to calculate the set of network weights used by the load balancer. In some embodiments, load balancing information 860 associates the destination machines with a single network weight NW calculated for the set of datapaths available to reach the edge node. In some embodiments, the network weight for a particular SD-WAN forwarding node 831, 832 or 833 is a function of the network weights associated with each path from the SD-WAN forwarding node 830 to the particular SD-WAN forwarding node 831, 832 or 833, as illustrated by the equations in FIG. 8, and as described above by reference to FIG. 7. The selection of a particular edge node for a data message is performed, in some embodiments, as described in relation to FIG. 6 for embodiments that select among edge nodes or destination machines instead of datapaths.

Figure 9:
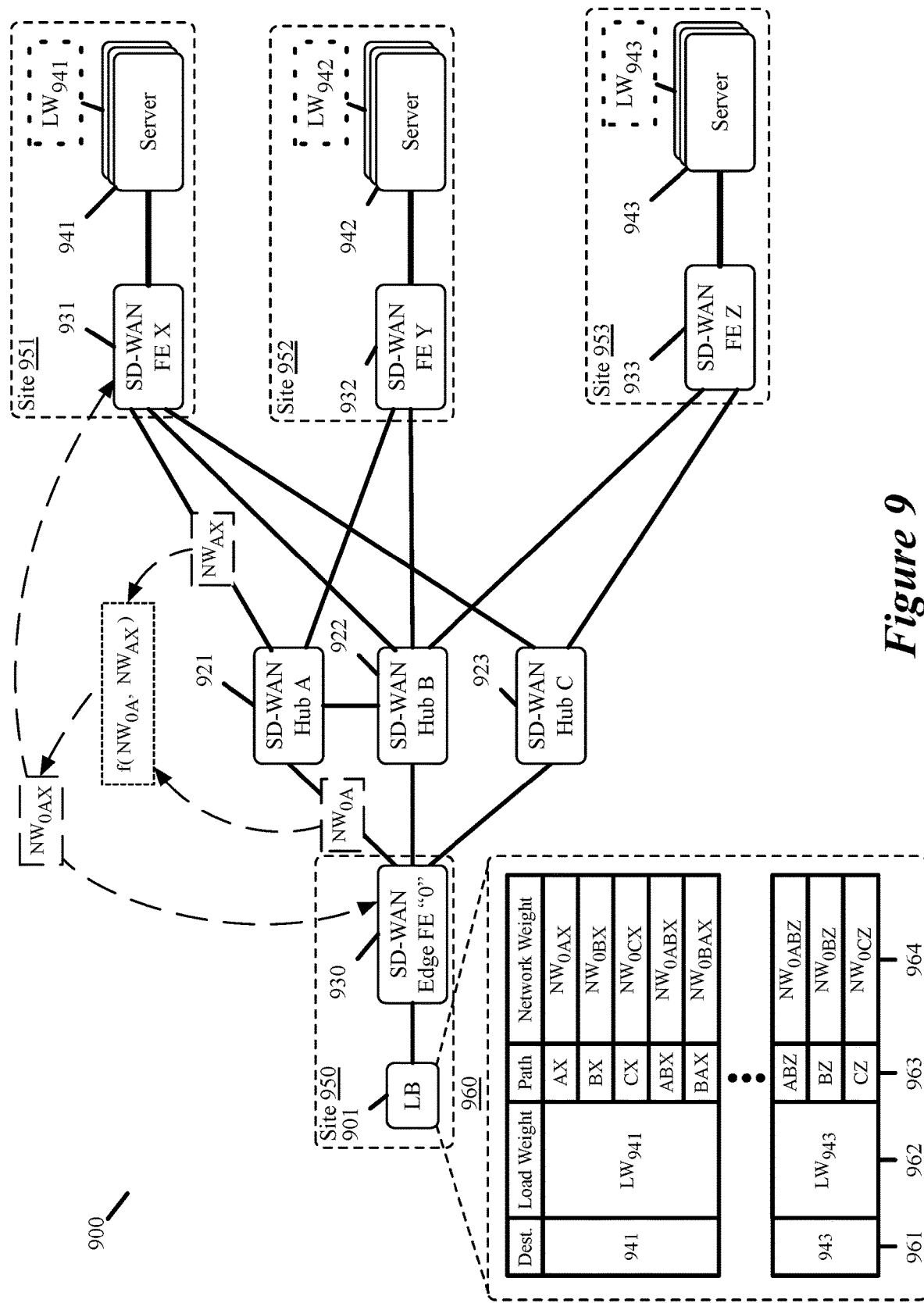
FIG. 9 illustrates a network in which a load balancing device uses a load weight and a network weight associated with each of a set of datapaths to a set of SD-WAN sites to select a particular datapath to a particular SD-WAN site for each received data message.

FIG. 9 illustrates a network 900 in which a load balancing device 901 uses a load weight 962 and a network weight 964 associated with each of a set of datapaths 963 (e.g., AX, BX, etc.) to a set of edge forwarding nodes of the SD-WAN to select a particular datapath to a particular edge node for each received data message. This network 900 includes four edge forwarding nodes 930-933 associated with four SD-WAN sites 950-953. In the illustrated embodiment, the SD-WAN FEs 931-933 serve as frontend load-balancing devices for the backend servers 941-943, respectively, and are identified as the destination machines. Each set of servers 931-933 is associated with a load weight $LW_{941}$-$LW_{943}$, which in some embodiments represents a set of load data (e.g., CPU load, memory load, session load, etc.) provided to, or maintained at, the load balancer.

The network 900 also includes a set of SD-WAN hubs 921-923 that facilitate connections between SD-WAN edge devices in some embodiments. As in FIG. 7, SD-WAN hubs 921-923, in some embodiments, execute in different physical locations (e.g., different datacenters) while in other embodiments some or all of the SD-WAN hubs 921-923 are in a single hub cluster at a particular physical location (e.g., an enterprise datacenter). SD-WAN hubs 921-923, in the illustrated embodiment, provide connections between the SD-WAN edge devices 930-933.

The load balancer 901 receives the load balancing data 960 (i.e., load weights $LW_{941}$-$LW_{943}$) and link state data (e.g., network weights (NW)) for the connection links between the SD-WAN elements. The link state data, as described above in relation to FIGS. 4 and 5, is either a set of network weights or is a set of attributes used to calculate the set of network weights used by the load balancer. As for load balancing information 960, load balancing information 960 has a destination machine identifier 961 (which in some embodiments identifies one of the edge nodes 931-933) to represent the server sets 941-943, and associates each destination with a load weight 962.

Additionally, load balancing information 960 identifies each datapath 963 to an edge node and stores a network weight 964 for each datapath 963. The network weight of each datapath, in some embodiments, is received as link state data, while in other embodiments the link state data is connection link attribute data (e.g., an intermediate network weight, or measures of connection link attributes) that is used to calculate the network weight for each datapath.

Based on the load weight 962, the load balancer 901 initially performs a first-load balancing operation to select (e.g., through a round robin selection that is based on the load weight) a particular candidate edge node from a set of candidate edge nodes. To do this, the load balancer in some embodiments performs an operation similar to operation 620 of FIG. 6. Based on the network weight, the load balancing operation then performs a second load-balancing operation (similar to operation 630 of FIG. 6) to select (e.g., through a round robin selection that is based on the network weight) a particular datapath to a selected particular edge node from one or more candidate datapaths to the particular edge node. By using this two-step load balancing operation, the load balancer 901 can identify candidate destination machines that meet certain criteria and then apply knowledge of the intervening network to select a particular datapath to a candidate destination machine that meets a different set of criteria that take into account a quality of the network connectivity (e.g., meets a minimum QoE metric).

Figure 10:
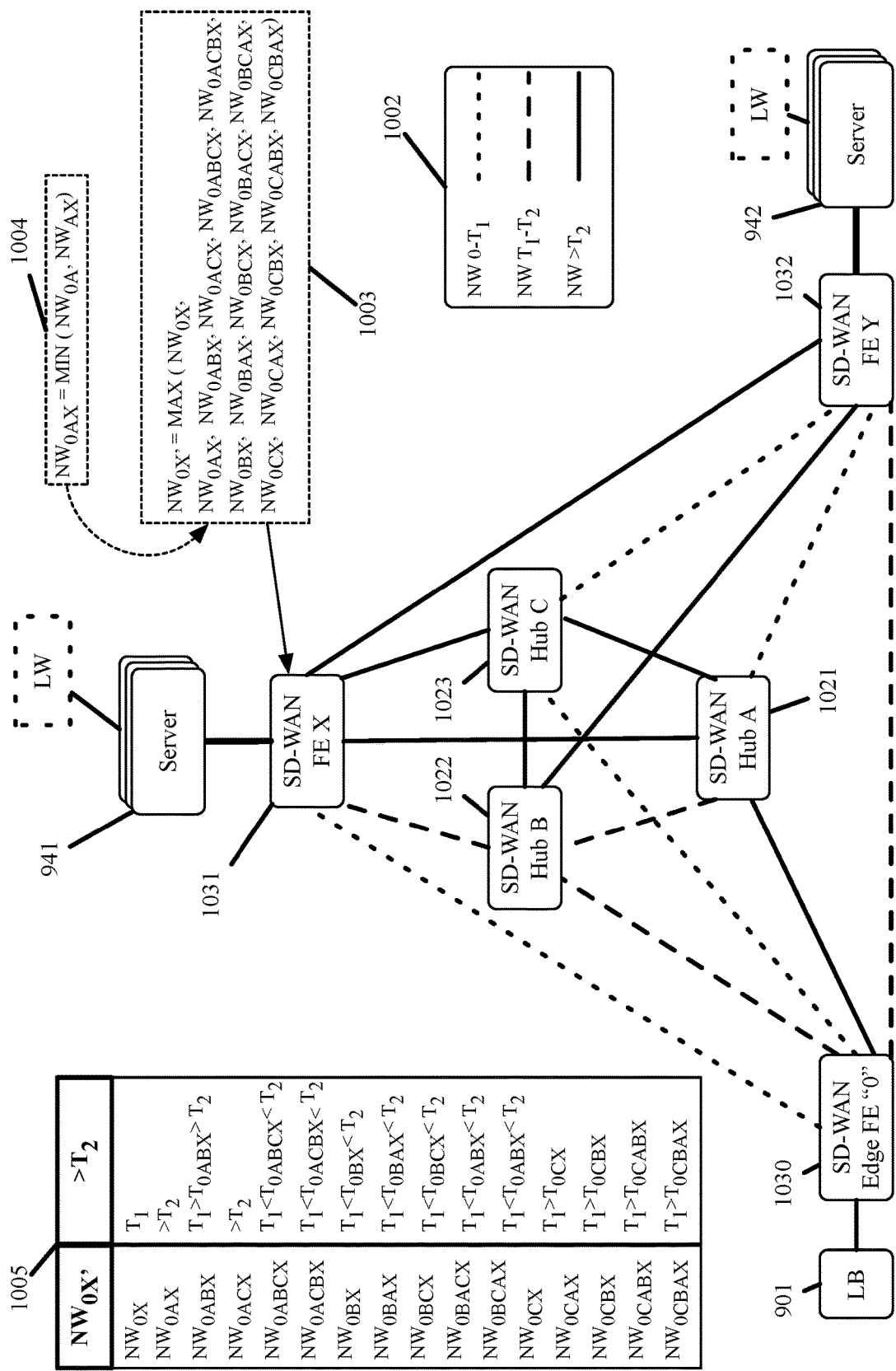
FIG. 10 illustrates a full mesh network among a set of SD-WAN edge nodes and a set of SD-WAN hubs connected by connection links of different qualities.

FIG. 10 illustrates a full mesh network among a set of SD-WAN edge nodes 1030-1032 and a set of SD-WAN hubs 1021-1023 connected by connection links of different qualities. In the illustrated embodiment, each connection link is assigned a network weight (e.g., a score) that is then compared to a set of two threshold network weights "T1" and "T2" that, in some embodiments, are user-specified. In other embodiments, the single network weight is replaced by a set of network weights for different attributes that can be used for load balancing different applications that are sensitive to different attributes of the connection links (e.g., flows that place heavier weight on speed (low latency) than on jitter or packet loss). The choice of two threshold values is selected for illustrative purposes and is not to be understood to be limiting.

Exemplary network weight calculations for each individual datapath and for collections of datapaths are illustrated using table 1002 which provides a legend identifying network weights of each connection link and equations 1003 and 1004. Equations 1003 and 1004 represent a simple min or max equation that identifies the network weight associated with the weakest connection link in a datapath as the network weight for the individual datapath and the network weight associated with the datapath with the highest network weight in a set of datapaths as the network weight for the set of datapaths between a source and a destination.

Using the minimum value for a particular datapath reflects the fact that for a particular datapath defined as traversing a particular set of connection links, the worst (e.g., slowest, most lossy, etc.) connection link will limit the connectivity along the datapath. In contrast, for a set of datapaths, the best datapath can be selected such that the best datapath defines the connectivity of the source and destination. For specific characteristics, such as a loss rate, a multiplicative formula, in some embodiments, will better reflect the loss rate (e.g., a number of data messages received divided by the total number of data messages sent). One of ordinary skill in the art will appreciate that the functions can be defined in many ways based on the number of different characteristics or attributes being considered and how they interact.

The results of equations 1003 and 1004 are illustrated in table 1005 identifying each individual datapath from SD-WAN Edge FE 1030 to SD-WAN FE 1031 (e.g., gateway "X"). Similar equations can be used to identify a network weight for datapaths (and the set of datapaths) from SD- WAN Edge FE 1030 to SD-WAN FE 1032 (e.g., gateway "Y"). As discussed above, some embodiments use the network weights for the individual datapaths to make load balancing decisions, while some embodiments use the network weight for the set of datapaths connecting a source and destination. However, one of ordinary skill in the art will appreciate that more complicated formulas that take into account the number of hops, or the individual characteristics that were used to calculate the network weight for each connection link, are used to compute a network weight or other value associated with each datapath or destination.

In the examples illustrated in FIGS. 2, 3, and 7-10, each edge forwarding node is said to perform the load balancing operations to select one destination machine from a set of destination machines associated with the edge forwarding node. In some embodiments, the edge forwarding node performs the load balancing operations by executing a load-balancing process. In other embodiments, the edge forwarding node directs a load balancer or set of load balancers that are co-located with the edge forwarding node at an SD-WAN site to perform the load-balancing operations for new data message flows that the edge forwarding node receives, and then forwards the data message flows to the destination machines selected by the load balancer(s). In still other embodiments, the edge forwarding node simply forwards the data message flows to a load balancer operating in the same SD-WAN site, and this load balancer selects the destination machines for each data message flow and forwards each flow to the destination machine that the load balancer selects.

Figure 11:
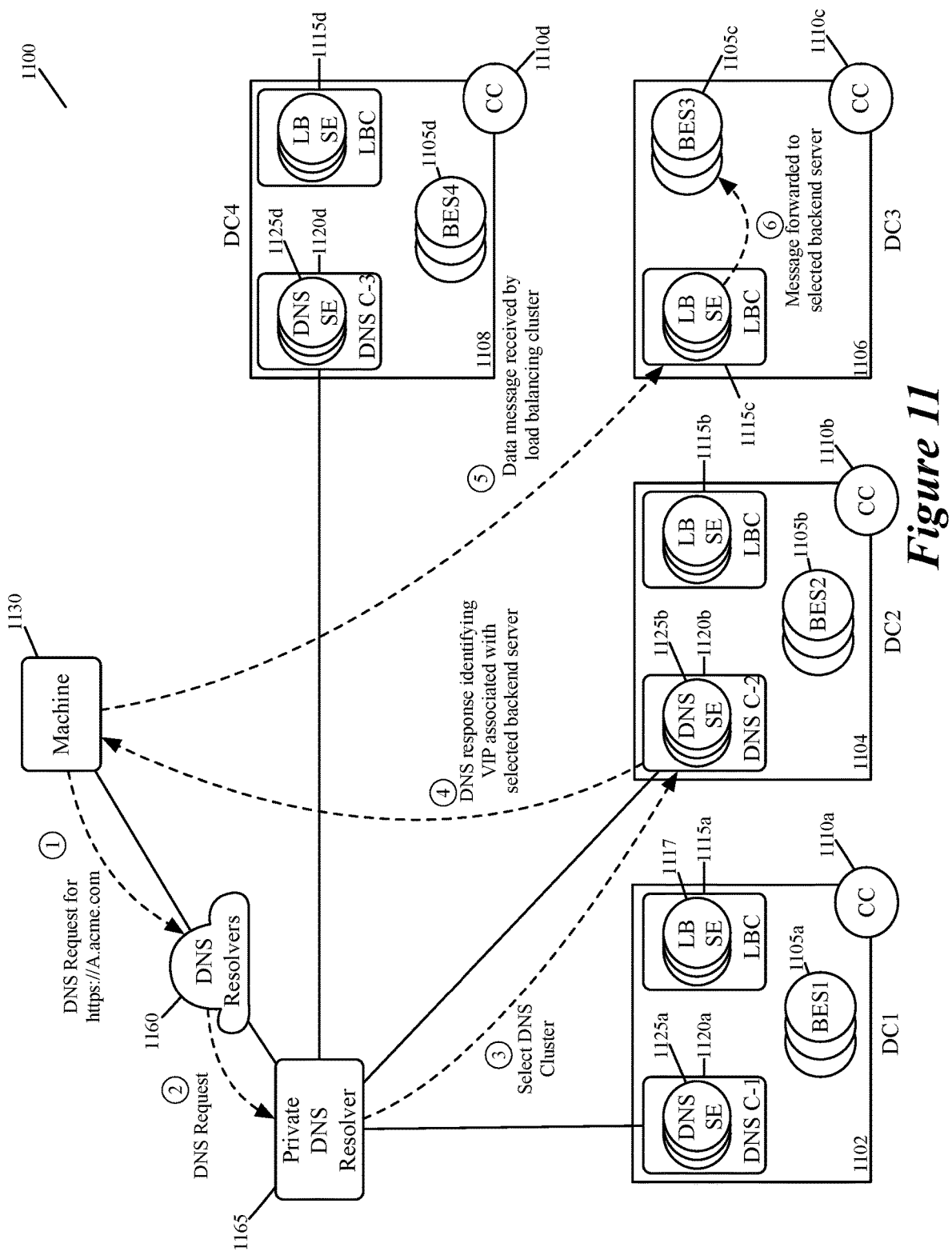
FIG. 11 illustrates an embodiment of a GSLB system that can use network-aware load balancing.

FIG. 11 illustrates a GSLB system 1100 that uses the network-aware load balancing of some embodiments. In this example, backend application servers 1105*a-d* are deployed in four datacenters 1102-1108: three of which are private datacenters 1102-1106 and one of which is a public datacenter 1108. The datacenters 1102-1108 in this example are in different geographical sites (e.g., different neighborhoods, different cities, different states, different countries, etc.).

A cluster of one or more controllers 1110 are deployed in each datacenter 1102-1108. Each datacenter 1102-1108 also has a cluster 1115 of load balancers 1117 to distribute the data message load across the backend application servers 1105 in the datacenter. In this example, three datacenters 1102, 1104, and 1108 also have a cluster 1120 of DNS service engines 1125 to perform DNS operations to process (e.g., to provide network addresses for a domain name) for DNS requests submitted by machines 1130 inside or outside of the datacenters. In some embodiments, the DNS requests include requests for fully qualified domain name (FQDN) address resolutions.

FIG. 11 illustrates the resolution of an FQDN that refers to a particular application "A" that is executed by the servers of the domain acme.com. As shown, this application is accessed through https and the URL "A.acme.com." The DNS request for this application is resolved in three steps. First, a public DNS resolver 1160 initially receives the DNS request and forwards this request to the private DNS resolver 1165 of the enterprise that owns or manages the private datacenters 1102-1106.

Second, the private DNS resolver 1165 selects one of the DNS clusters 1120. This selection is based on a set of load balancing criteria that distributes the DNS request load across the DNS clusters 1120. In the example illustrated in FIG. 11, the private DNS resolver 1165 selects the DNS cluster 1120*b* of the datacenter 1104.

Third, the selected DNS cluster 1120*b* resolves the domain name to an IP address. In some embodiments, each DNS cluster 1120 includes multiple DNS service engines 1125, such as DNS service virtual machines (SVMs) that execute on host computers in the cluster's datacenter. When a DNS cluster 1120 receives a DNS request, a frontend load balancer (not shown) in some embodiments selects a DNS service engine 1125 in the cluster 1120 to respond to the DNS request, and forwards the DNS request to the selected DNS service engine 1125. Other embodiments do not use a frontend load balancer, and instead have a DNS service engine 1125 serve as a frontend load balancer that selects itself or another DNS service engine 1125 in the same cluster 1120 for processing the DNS request.

The DNS service engine 1125*b* that processes the DNS request then uses a set of criteria to select one of the backend server clusters 1105 for processing data message flows from the machine 1130 that sent the DNS request. The set of criteria for this selection in some embodiments includes at least one of (1) load weights identifying some measure of load on each backend cluster 1105, (2) a set of network weights as described above reflecting a measure of connectivity, and (3) a set of health metrics as further described in U.S. patent application Ser. No. 16/746,785 filed on Jan. 17, 2020 which is incorporated herein by reference. Also, in some embodiments, the set of criteria include load balancing criteria that the DNS service engines use to distribute the data message load on backend servers that execute application "A."

In the example illustrated in FIG. 11, the selected backend server cluster is the server cluster 1105*c* in the private datacenter 1106. After selecting this backend server cluster 1105*c* for the DNS request that it receives, the DNS service engine 1125*b* of the DNS cluster 1120*b* returns a response to the requesting machine. As shown, this response includes the VIP address associated with the selected backend server cluster 1105*c*. In some embodiments, this VIP address is associated with the local load balancer cluster 1115*c* that is in the same datacenter 1106 as the selected backend server cluster.

After getting the VIP address, the machine 1130 sends one or more data message flows to the VIP address for a backend server cluster 1105 to process. In this example, the data message flows are received by the local load balancer cluster 1115*c*. In some embodiments, each load balancer cluster 1115 has multiple load balancing engines 1117 (e.g., load balancing SVMs) that execute on host computers in the cluster's datacenter.

When the load balancer cluster receives the first data message of the flow, a frontend load balancer (not shown) in some embodiments selects a load balancing service engine 1117 in the cluster 1115 to select a backend server 1105 to receive the data message flow, and forwards the data message to the selected load balancing service engine 1117. Other embodiments do not use a frontend load balancer, and instead have a load balancing service engine in the cluster serve as a frontend load balancer that selects itself or another load balancing service engine in the same cluster for processing the received data message flow.

When a selected load balancing service engine 1117 processes the first data message of the flow, this service engine 1117 uses a set of load balancing criteria (e.g., a set of weight values) to select one backend server from the cluster of backend servers 1105*c* in the same datacenter 1106. The load balancing service engine 1117 then replaces the VIP address with an actual destination IP (DIP) address of the selected backend server 1105*c*, and forwards the data message and subsequent data messages of the same flow to the selected back end server 1105*c*. The selected backend server 1105*c* then processes the data message flow, and when necessary, sends a responsive data message flow to the machine 1130. In some embodiments, the responsive data message flow is through the load balancing service engine 1117 that selected the backend server 1105*c* for the initial data message flow from the machine 1130.

Figure 12:
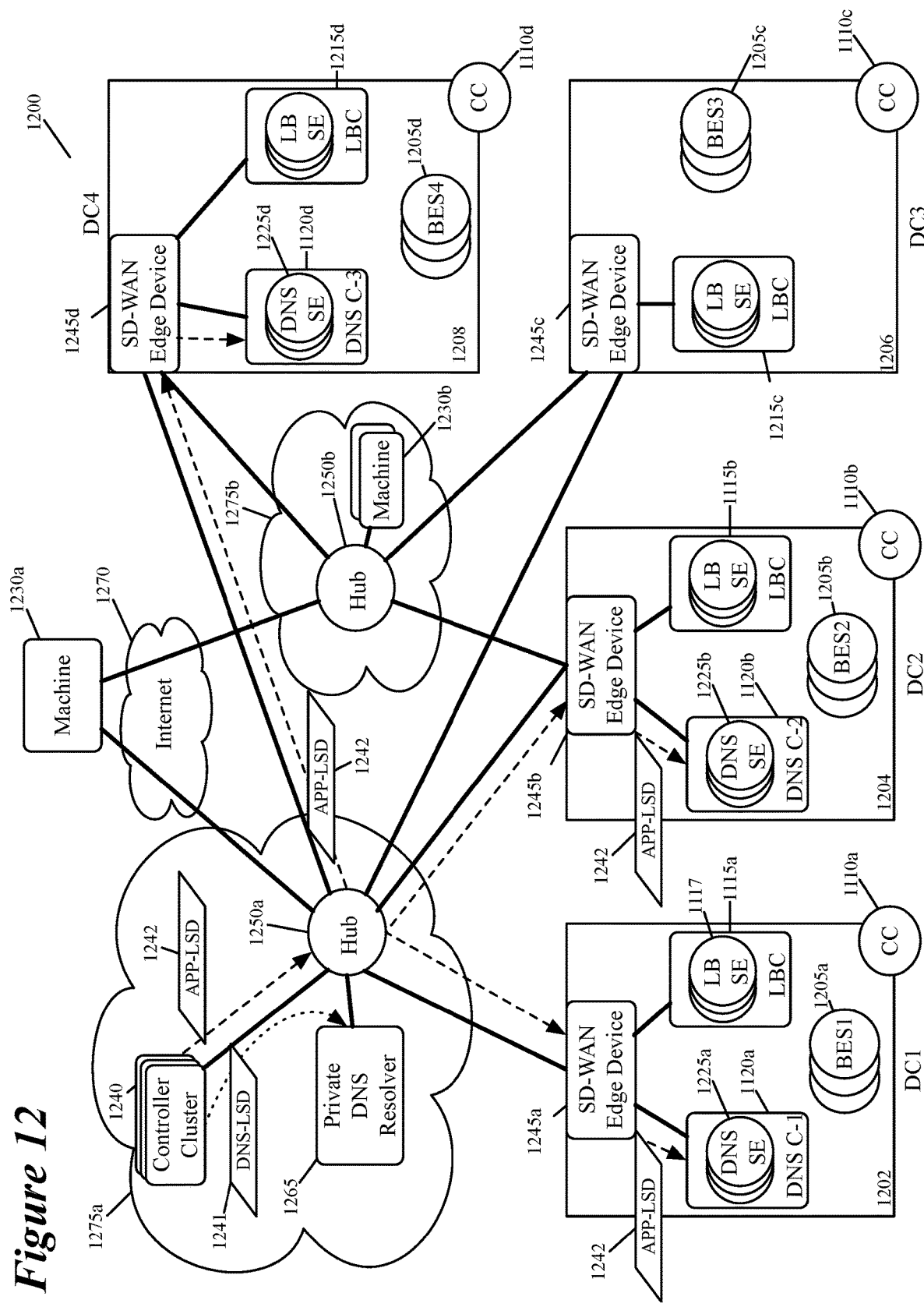
FIG. 12 illustrates an embodiment including a network-aware GSLB system deployed in an SD-WAN using network-aware load balancing.

FIG. 12 illustrates an embodiment including a network-aware GSLB system 1200 deployed in an SD-WAN using network-aware load balancing. The system 1200 includes a set of four datacenters 1202-1208, three of which are private datacenters 1202-1206 and one of which is a public datacenter 1208 as in FIG. 11. The set of four datacenters 1202-1208 are part of the SD-WAN, and each hosts an SD-WAN edge device 1245 (e.g., a multi-tenant SD-WAN edge FE, gateway or hub) that facilitates communications within the SD-WAN. The four datacenters 1202-1208, in this embodiment, are connected by a set of hubs 1250*a-b* in datacenters 1275*a-b* (e.g., a private or public datacenter) that facilitate communication between external or internal machines 1230*a-b* and the backend servers 1205. As shown, external machine 1230*a* connects to the hubs 1250*a-b* through the internet 1270, and the hubs 1250*a-b* may also serve as gateways for access to external networks or machines.

As in FIG. 3, the SD-WAN controller cluster 1240 sends link state data (LSD) to other load balancing elements of the SD-WAN. In system 1200, the controller cluster 1240 generates (1) link state data (e.g., DNS-LSD 1241) for load balancing among the DNS servers and (2) link state data (e.g., APP-LSD 1242) for load balancing among the applications (i.e., the sets of backend servers 1205). The DNS-LSD 1241 is provided to the private DNS resolver 1265 to be used to perform the first level of load balancing among the DNS servers in the different data servers based on load weights and the link state data (or data derived from the link state data) and a set of load balancing criteria similarly to the process for selecting a destination machine described above in relation to FIGS. 6-10. The APP-LSD 1242 is provided to the DNS service engines 1225*a-d* to perform the second level of load balancing among the backend server clusters 1205*a-d* based on load balancing criteria or load weights and the link state data (or data derived from the link state data) and a set of load balancing criteria, similarly to the process for selecting a destination machine described above in relation to FIGS. 6-10. In the illustrated embodiment, the load balancer clusters 1115*a-d* are not provided with any link state data as connections within a datacenter are not usually subject to the same variations in connectivity as connection links between datacenters.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
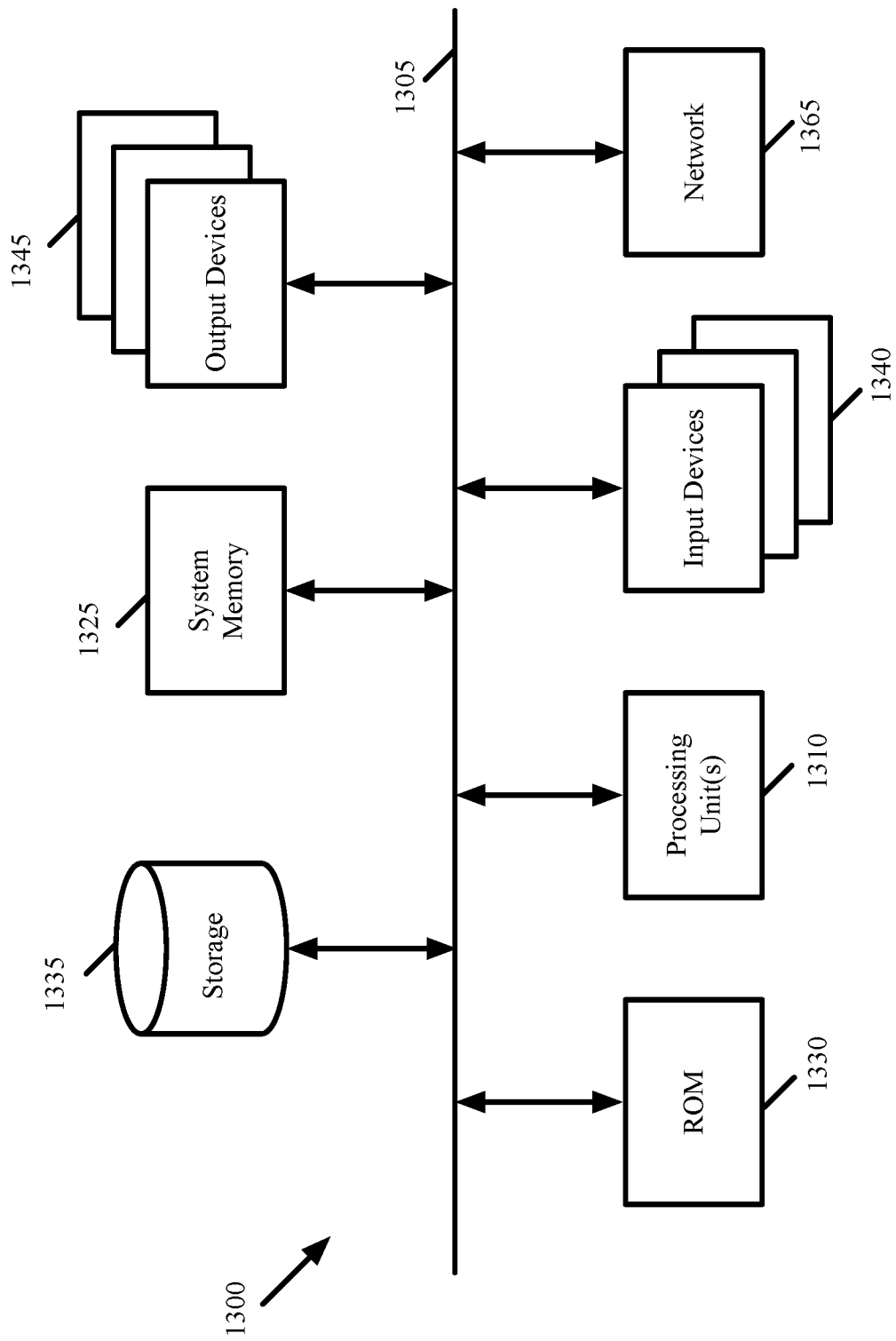
FIG. 13 conceptually illustrates a computer system with which some embodiments of the invention are implemented.

FIG. 13 conceptually illustrates a computer system 1300 with which some embodiments of the invention are implemented. The computer system 1300 can be used to implement any of the above-described hosts, controllers, gateway and edge forwarding elements. As such, it can be used to execute any of the above-described processes. This computer system 1300 includes various types of non-transitory machine-readable media and interfaces for various other types of machine-readable media. Computer system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the computer system 1300. For instance, the bus 1305 communicatively connects the processing unit(s) 1310 with the read-only memory 1330, the system memory 1325, and the permanent storage device 1335.

From these various memory units, the processing unit(s) 1310 retrieve instructions to execute and data to process in order to execute the processes of the invention. The processing unit(s) may be a single processor or a multi-core processor in different embodiments. The read-only-memory (ROM) 1330 stores static data and instructions that are needed by the processing unit(s) 1310 and other modules of the computer system. The permanent storage device 1335, on the other hand, is a read-and-write memory device. This device is a non-volatile memory unit that stores instructions and data even when the computer system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device 1335. Like the permanent storage device 1335, the system memory 1325 is a read-and-write memory device. However, unlike storage device 1335, the system memory 1325 is a volatile read-and-write memory, such as random access memory. The system memory 1325 stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices 1340 enable the user to communicate information and select commands to the computer system 1300. The input devices 1340 include alphanumeric keyboards and pointing devices (also called "cursor control devices"). The output devices 1345 display images generated by the computer system 1300. The output devices 1345 include printers and display devices, such as cathode ray tubes (CRT) or liquid crystal displays (LCD).

Some embodiments include devices such as touchscreens that function as both input and output devices 1340 and 1345.

Finally, as shown in FIG. 13, bus 1305 also couples computer system 1300 to a network 1365 through a network adapter (not shown). In this manner, the computer 1300 can be a part of a network of computers (such as a local area network ("LAN"), a wide area network ("WAN"), or an Intranet), or a network of networks (such as the Internet). Any or all components of computer system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments deploy gateways in public cloud datacenters. However, in other embodiments, the gateways are deployed in a third-party's private cloud datacenters (e.g., datacenters that the third-party uses to deploy cloud gateways for different entities in order to deploy virtual networks for these entities). Thus, one of ordinary skill in the art would understand that the invention is not to be limited by the foregoing illustrative details, but rather is to be defined by the appended claims.

The invention claimed is:

1. A method of providing network-aware load balancing for data messages traversing a software-defined wide area network (SD-WAN) comprising a plurality of connection links between different elements of the SD-WAN, the method comprising:
   at a load balancer,
      receiving link state data relating to a set of SD-WAN datapaths comprising a set of connection links in the plurality of connection links, wherein the load balancer provides load balancing for a set of destination machines connected to the load balancer over the set of SD-WAN datapaths;
      receiving a data message from a device connected to the SD-WAN destined to a destination machine in the set of destination machines;
      selecting, for the data message, a particular destination machine in the set of destination machines by performing a load balancing operation based on the received link state data, the link state data comprising attributes of different types of physical links; and
      forwarding the data message to the selected particular destination machine in the set of destination machines.

2. The method of claim 1, wherein the load balancer receives the link state data from a controller of the SD-WAN.

3. The method of claim 1, wherein the load balancer receives the link state data from a collocated SD-WAN device.

4. The method of claim 1 further comprising receiving load information regarding each destination machine in the set of destination machines, wherein the load balancing operation is further based on the received load information.

5. The method of claim 4, wherein the load balancing operation comprises computing a weight associated with each destination machine in the set of destination machines based on (i) the link state data and (ii) the received load information.

6. The method of claim 4, wherein the load balancing operation comprises:
   a first load balancing sub-operation based on the received load information that selects a set of candidate destination machines in the set of destination machines; and
   a second load balancing sub-operation based on the link state data to select the particular destination machine from the set of candidate destination machines.

7. The method of claim 6, wherein the second load balancing sub-operation based on the link state data further selects a particular datapath associated with a candidate destination machine.

8. The method of claim 1, wherein the set of destination machines is a set of SD-WAN edge devices that each provide access to resources associated with the SD-WAN edge device.

9. The method of claim 8, wherein each SD-WAN edge device in the set of SD-WAN edge devices is associated with a data center in which the resources associated with the SD-WAN edge device execute.

10. The method of claim 1, wherein the set of destination machines comprises a set of frontend load balancers for a set of backend compute nodes.

11. The method of claim 1, wherein the set of datapaths comprises a subset of multiple datapaths to a same destination machine in the set of destination machines, wherein at least two datapaths in the subset of multiple datapaths traverse at least one of different SD-WAN hubs, and different SD-WAN gateways.

12. The method of claim 1, wherein the set of multiple datapaths to the same destination machine comprise at least two datapaths that traverse a same set of components of the SD-WAN in different orders.

13. The method of claim 1, wherein a plurality of the connection links that are included in the set of SD-WAN datapaths are tunnels between two elements of the SD-WAN and the link state data is based on characteristics of the tunnel and the elements of the SD-WAN that terminate the tunnels.

14. The method of claim 1, wherein the received link state data is a set of weights used to perform the load balancing operation.

15. The method of claim 14, wherein the set of weights comprises, for each destination machine, (1) a first load weight indicating at least one of a CPU load, a memory load, and a session load on the destination machine and (2) a second network weight associated with a set of datapaths connecting the load balancer to the destination machine.

16. The method of claim 14, wherein the set of weights comprises, for each datapath in the set of datapaths, (1) a first load weight indicating at least one of a CPU load, a memory load, and a session load on the associated destination machine and (2) a second network weight associated with a particular set of connection links making up the datapath based on the received connection link characteristic data.

17. The method of claim 1, wherein the link state data comprises at least one of a current measure of latency for each datapath in the plurality of datapaths, a current measure of latency for each datapath in the plurality of datapaths, a current measure of jitter for each datapath in the plurality of datapaths, and a current measure of quality of experience score for each datapath in the plurality of datapaths.

18. The method of claim 17, wherein the link state data further comprises at least one of a historical measure of latency for each datapath in the plurality of datapaths, a historical measure of latency for each datapath in the plurality of datapaths, a historical measure of jitter for each datapath in the plurality of datapaths, and a historical measure of quality of experience score for each datapath in the plurality of datapaths.

19. The method of claim 1, wherein the link state data comprises at least one of a current measure of latency for each connection link in the set of connection links, a current measure of latency for each connection link in the set of connection links, a current measure of jitter for each connection link in the set of connection links, and a current measure of quality of experience score for each connection link in the set of connection links.

20. The method of claim 19, wherein the link state data further comprises at least one of a historical measure of latency for each connection link in the set of connection links, a historical measure of latency for each connection link in the set of connection links, a historical measure of jitter for each connection link in the set of connection links, and a historical measure of quality of experience score for each connection link in the set of connection links.

21. A non-transitory machine readable medium storing a program for execution by at least one processor, the program for performing any one of the method claims 1-20.

* * * * *